United States Patent [19]
Schleicher

[11] Patent Number: 5,408,735
[45] Date of Patent: Apr. 25, 1995

[54] METHOD FOR FORMING A CLINCH JOINT

[76] Inventor: Louis C. Schleicher, 1917 Marcastle Ct., Rochester Hills, Mich. 48063

[21] Appl. No.: 188,143

[22] Filed: Jan. 27, 1994

Related U.S. Application Data

[62] Division of Ser. No. 764,188, Sep. 23, 1991, Pat. No. 5,305,517.

[51] Int. Cl.$^6$ .................. B23P 11/00; B21D 39/00
[52] U.S. Cl. .................. 29/432.2; 29/521; 29/522.1
[58] Field of Search .................. 29/432, 432.1, 432.2, 29/521, 522.1, 509, 243.5, 243.53, 283.5, 798

[56] References Cited

U.S. PATENT DOCUMENTS

| | | |
|---|---|---|
| 3,359,935 | 12/1967 | Rosebottom . |
| 3,579,809 | 5/1971 | Wolf .................. 29/509 |
| 4,208,776 | 6/1980 | Schleicher .................. 29/243.5 |
| 4,394,794 | 7/1983 | Shirey .................. 29/432 |
| 4,459,735 | 7/1984 | Sawdon .................. 29/509 |
| 4,569,111 | 2/1986 | Mutou .................. 29/283.5 |
| 4,614,017 | 9/1986 | Eckold et al. .................. 29/243.53 |
| 4,658,502 | 4/1987 | Eckold et al. .................. 29/798 |
| 4,831,704 | 5/1989 | Rapp .................. 29/243.53 X |
| 4,856,316 | 8/1989 | Slasinski .................. 29/521 X |
| 5,051,020 | 9/1991 | Schleicher .................. 29/798 X |
| 5,208,974 | 5/1993 | Sawdon et al. .................. 29/798 |
| 5,259,102 | 11/1993 | Obrecht .................. 29/509 X |
| 5,267,383 | 12/1993 | Sawdon .................. 29/243.5 |
| 5,315,743 | 5/1994 | Schleicher .................. 29/243.5 |

FOREIGN PATENT DOCUMENTS 526042 3/1955 Italy .

OTHER PUBLICATIONS

SAE Technical Paper Series, "A New Mechanical Joining Technique For Steel Compared With Spot Welding", by J. M. Sawhill, Jr. and S. E. Sawdon, 1983.

*Primary Examiner*—Tom Hughes
*Attorney, Agent, or Firm*—Brooks & Kushman

[57] ABSTRACT

A series of related clinch joints as well as methods and apparatus for forming these joints are disclosed. All of the leak proof drawings are capable of being fabricated using a solid non-radially expandable die having a recessed cavity formed therein for cooperation with a corresponding punch having a solid punch projection. The clearance between the punch and the die recess are specifically sized relative to the material thickness to achieve optimum fastening characteristics. Several joint embodiments utilize variable clearance between the punch and the die to minimize strength variability resulting from changing material thickness. Alternative lance type and leak proof joints utilize a variable clearance between the punch and the die to achieve both high, shear and peel strength in a single joint design.

12 Claims, 21 Drawing Sheets

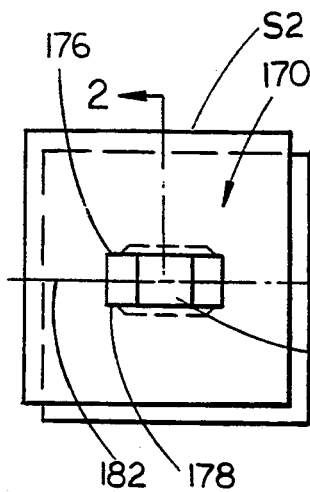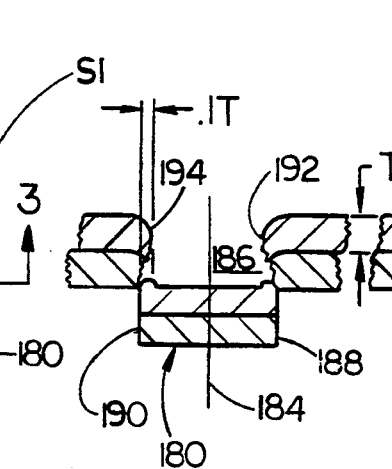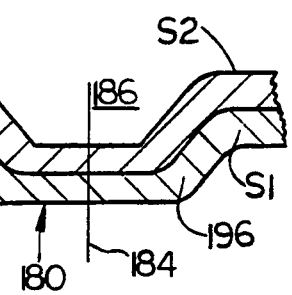
FIG. 1　　　FIG. 2　　　FIG. 3
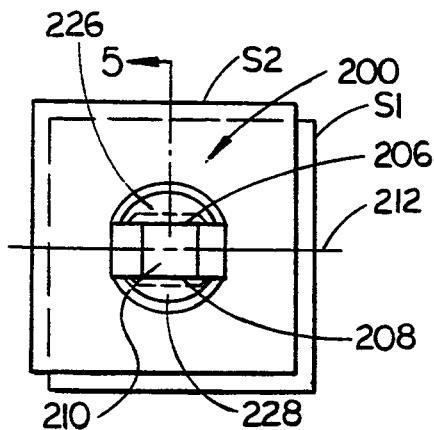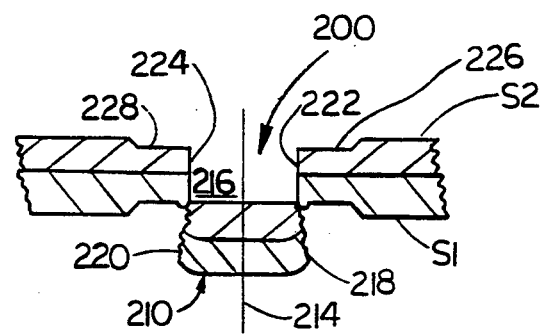
FIG. 4　　　FIG. 5
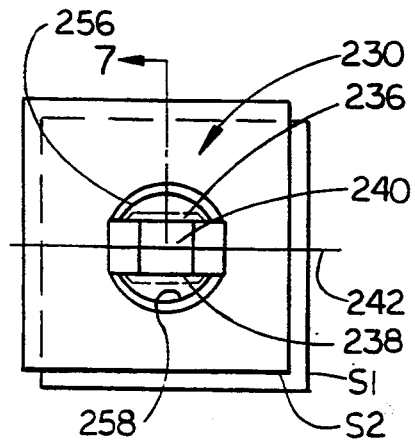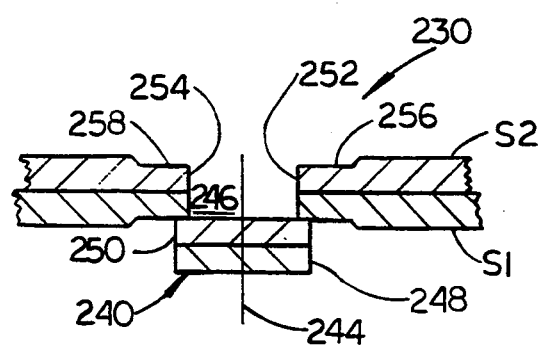
FIG. 6　　　FIG. 7

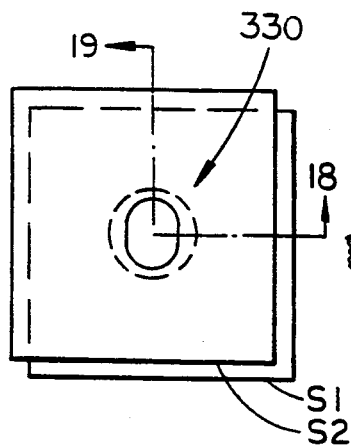
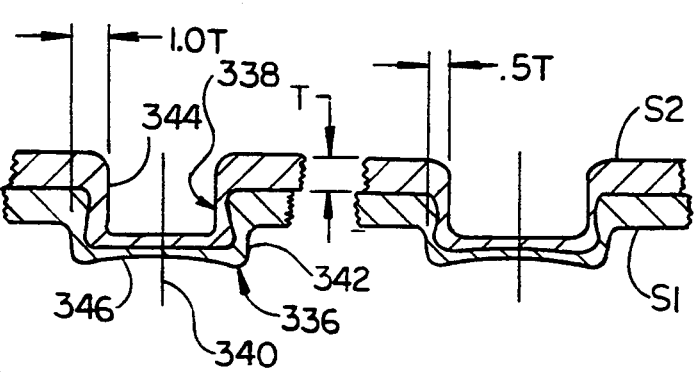
FIG. 17  FIG. 18  FIG. 19
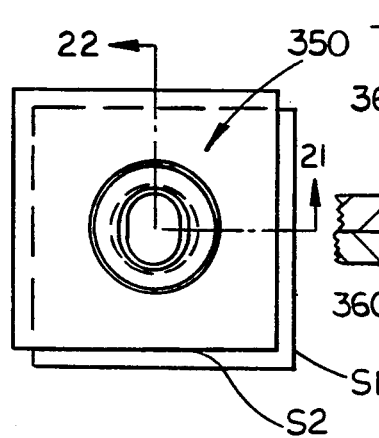
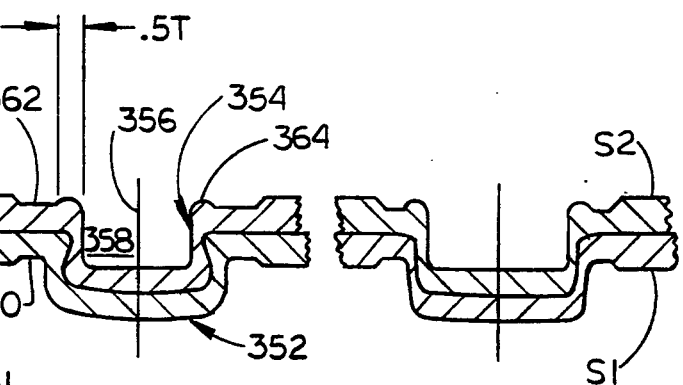
FIG. 20  FIG. 21  FIG. 22
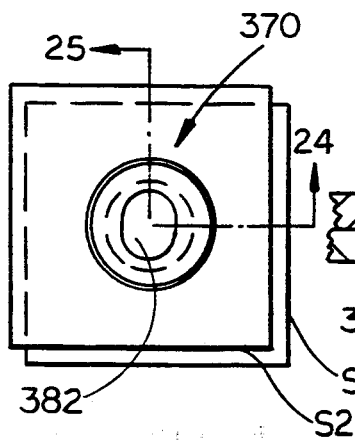
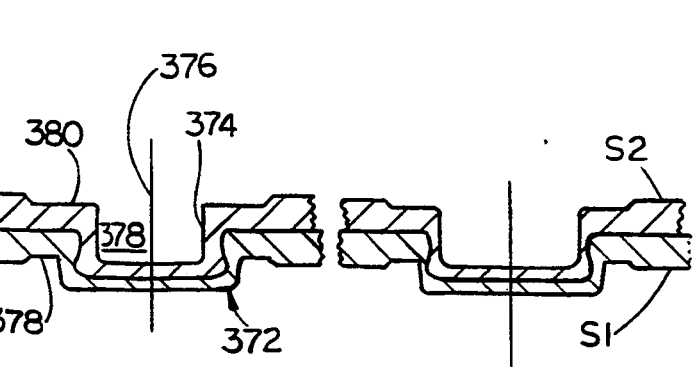
FIG. 23  FIG. 24  FIG. 25

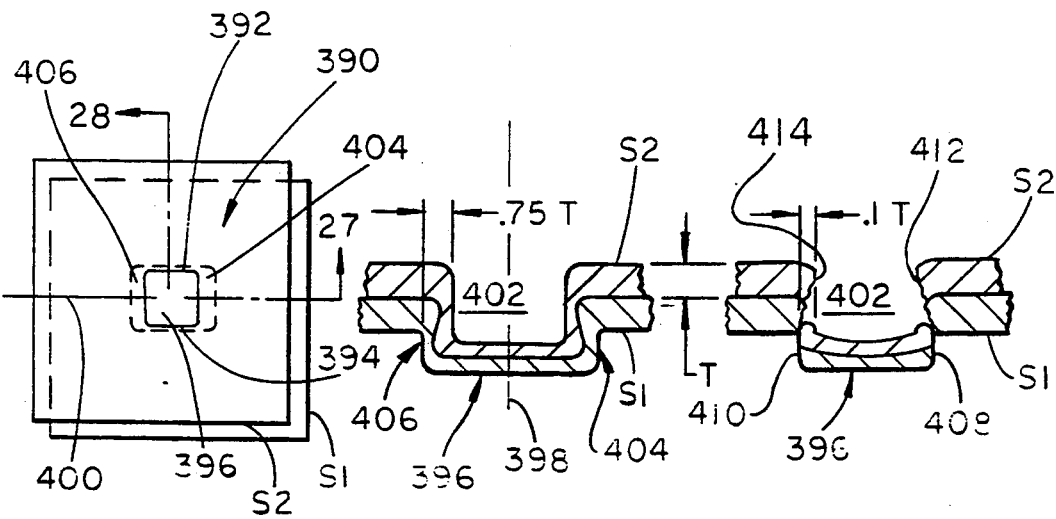
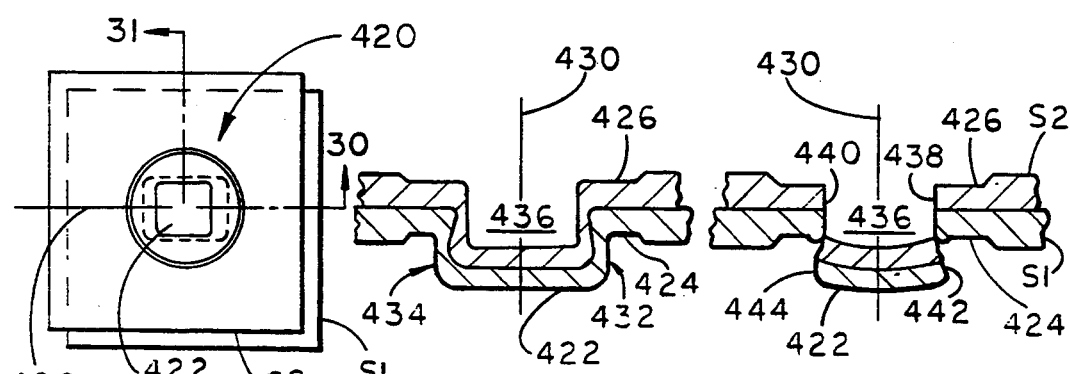
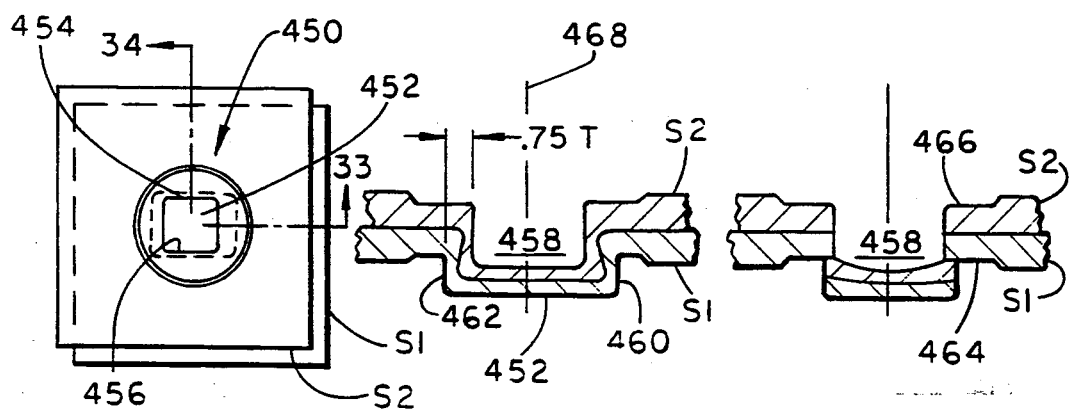

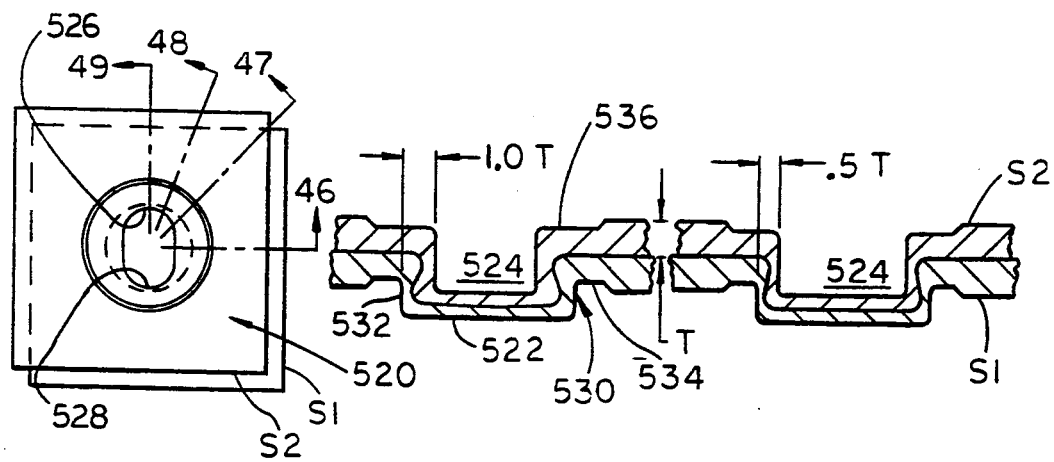
FIG. 45    FIG. 46    FIG. 47
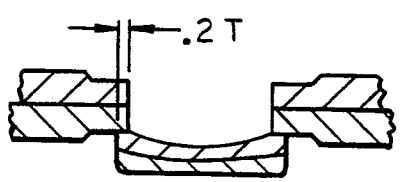    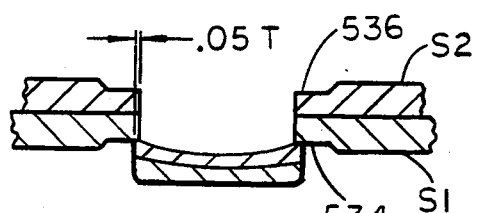
FIG. 48    FIG. 49
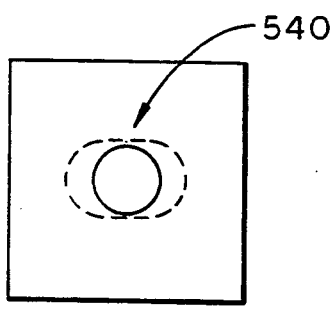    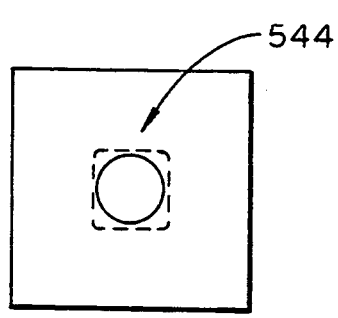
FIG. 50    FIG. 51
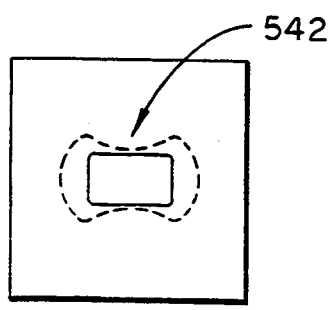    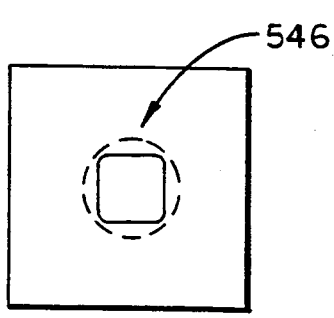
FIG. 52    FIG. 53

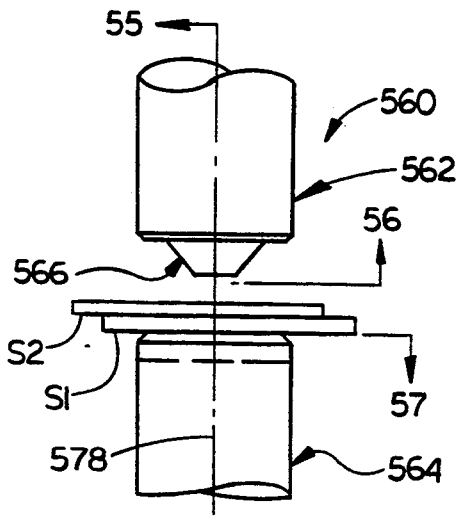
FIG. 54
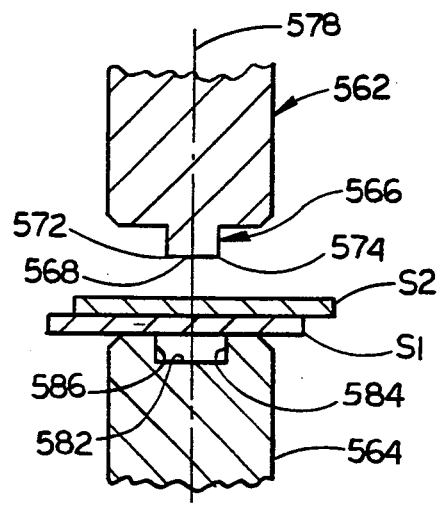
FIG. 55
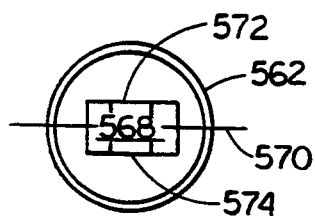
FIG. 56
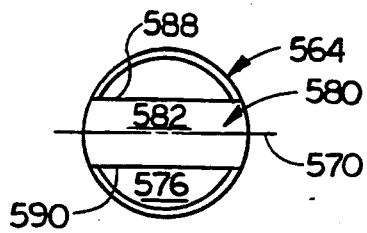
FIG. 57
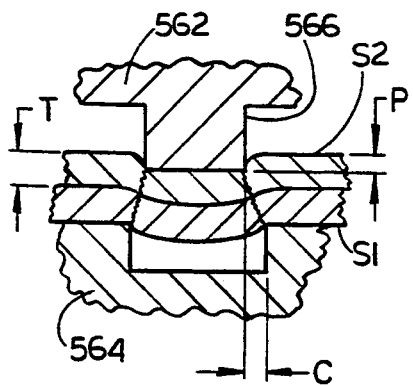
FIG. 58
FIG. 59
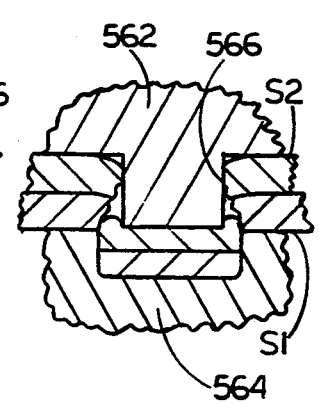
FIG. 60

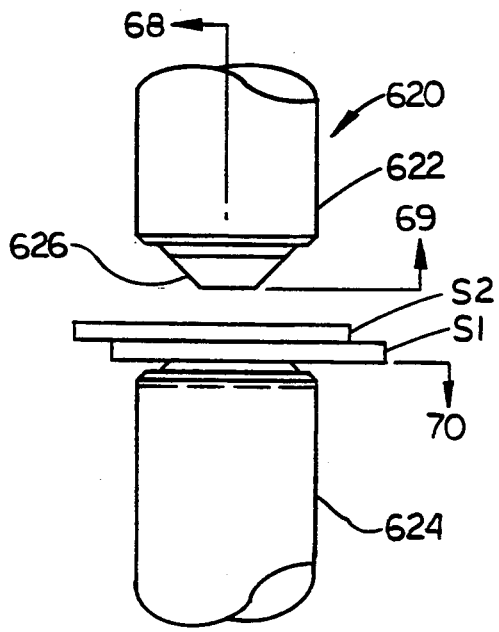
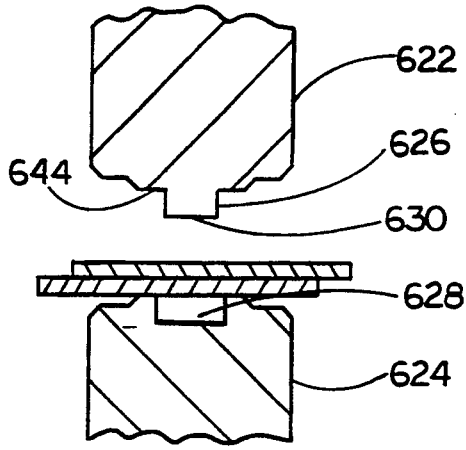
FIG. 67          FIG. 68
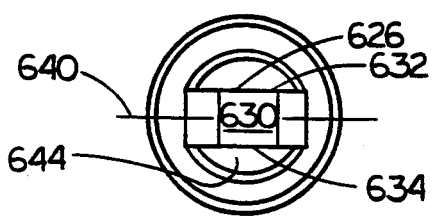
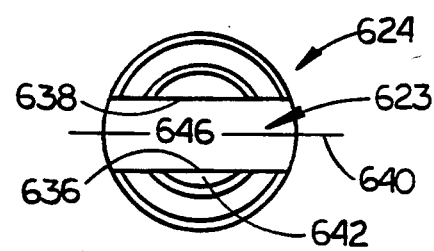
FIG. 69          FIG. 70
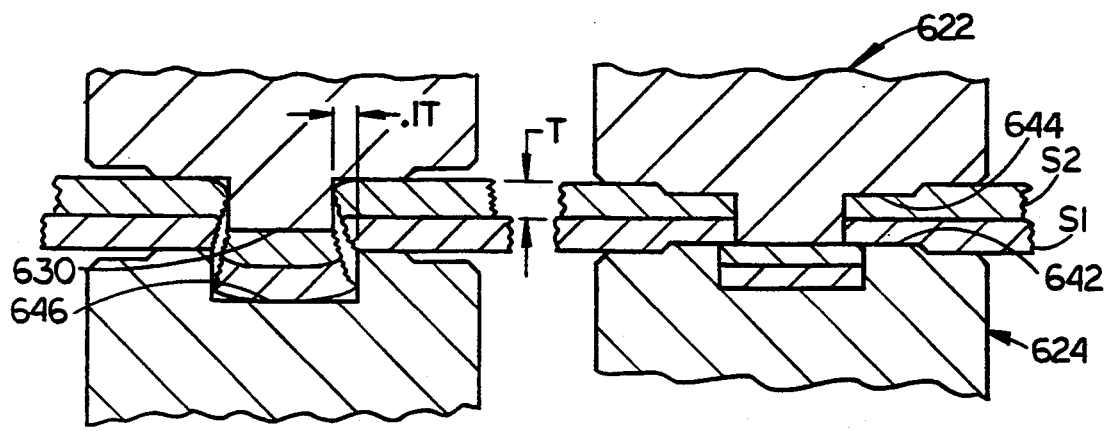
FIG. 71          FIG. 72

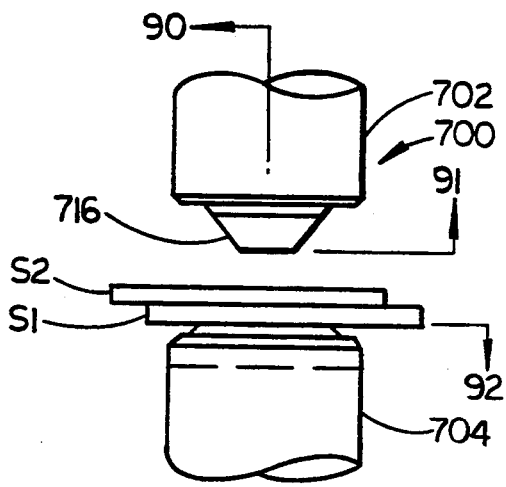
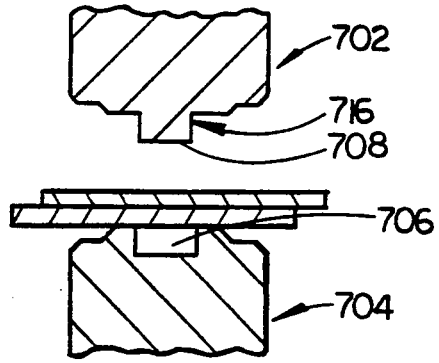
FIG. 89  FIG. 90
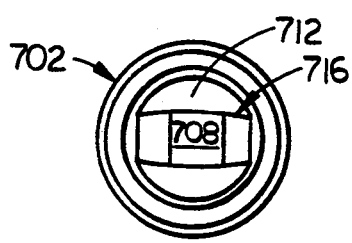
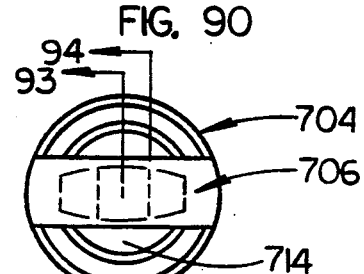
FIG. 91  FIG. 92
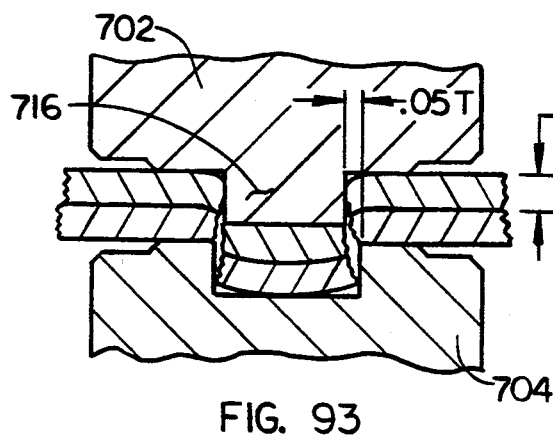
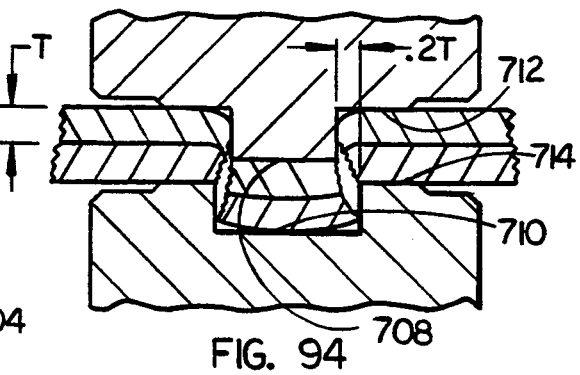
FIG. 93  FIG. 94
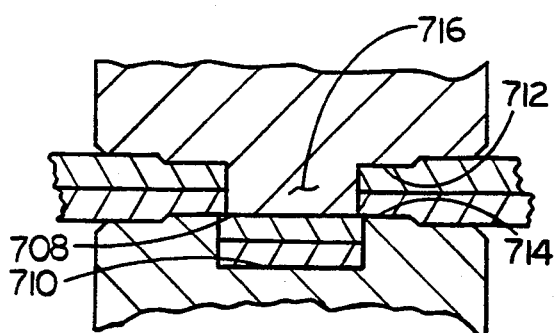
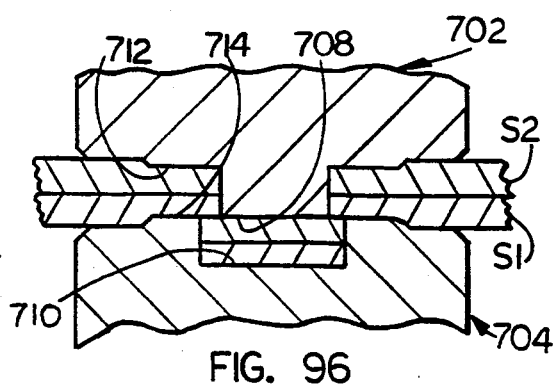
FIG. 95  FIG. 96

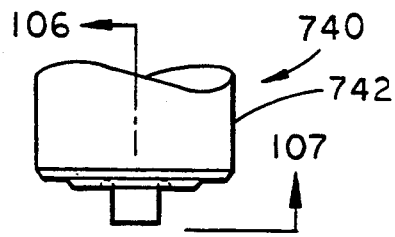
FIG.105
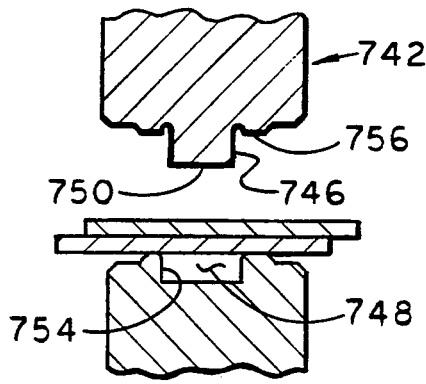
FIG.106
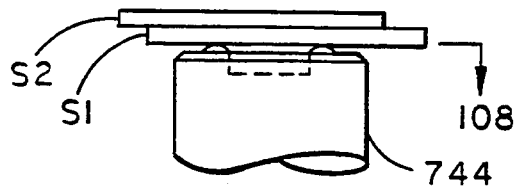
FIG.107
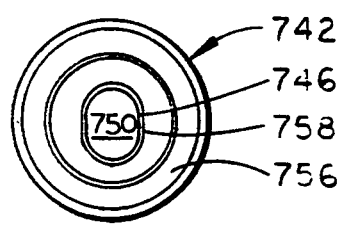
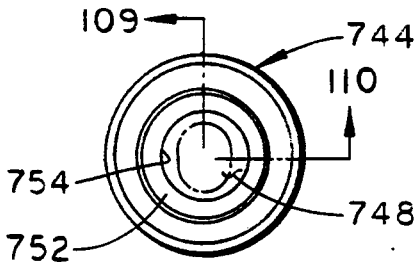
FIG.108
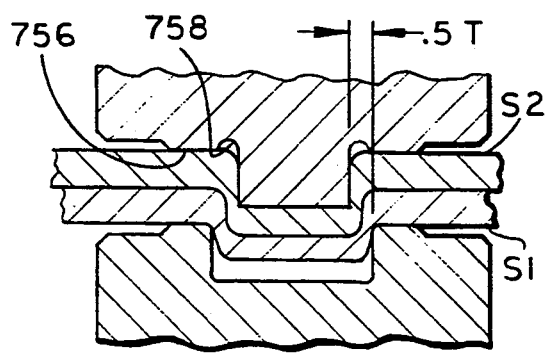
FIG.109
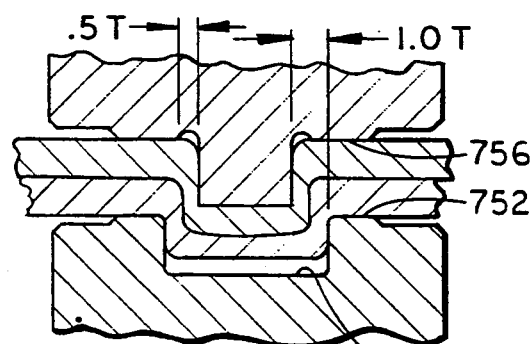
FIG.110
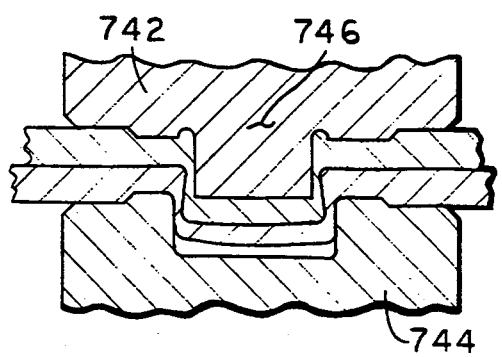
FIG.111
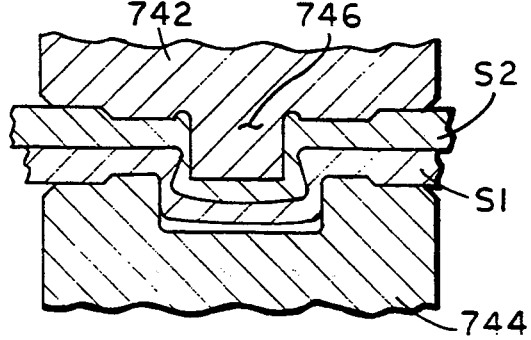
FIG 112

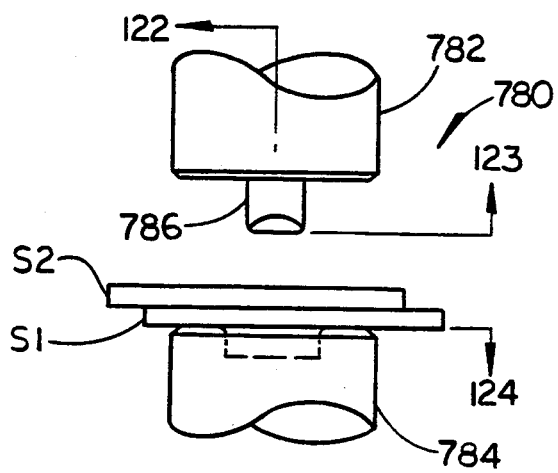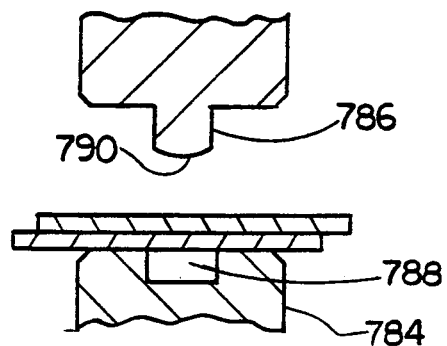
FIG. 121  FIG. 122
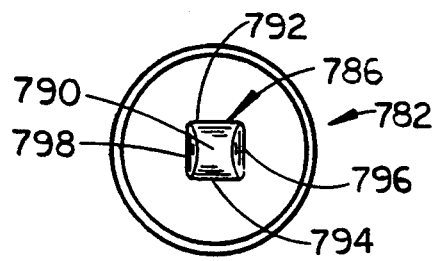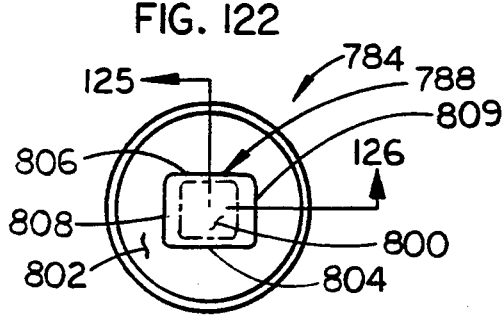
FIG. 123  FIG. 124
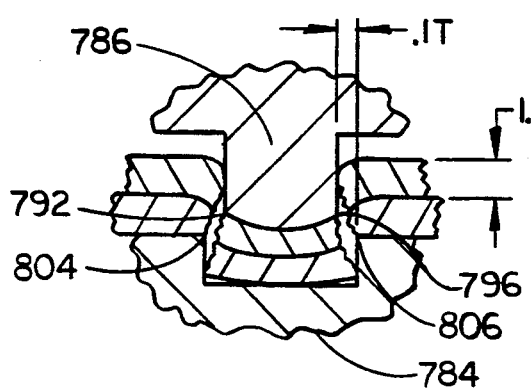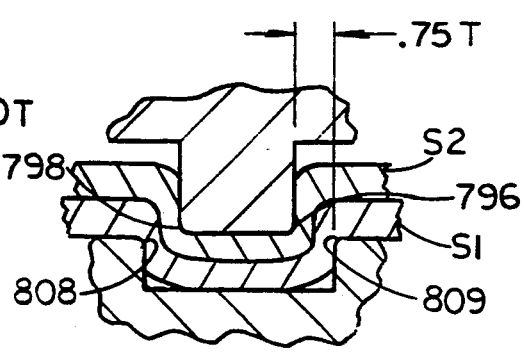
FIG. 125  FIG. 126
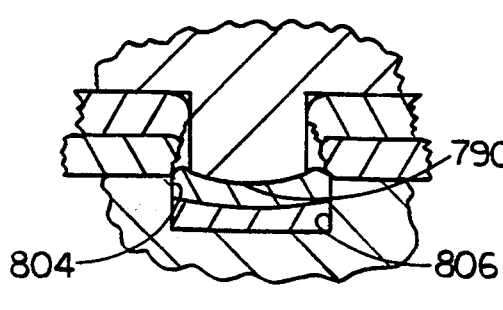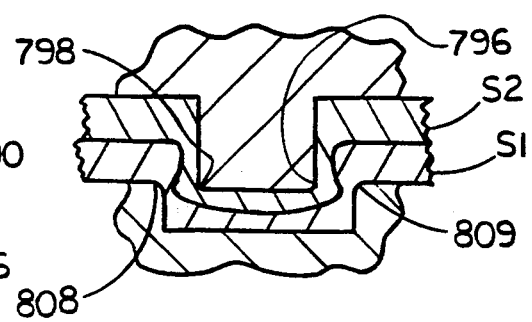
FIG. 127  FIG. 128

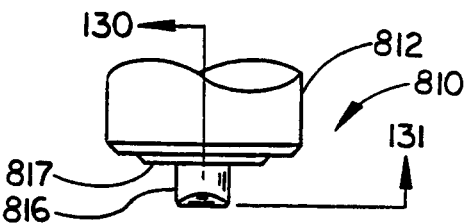
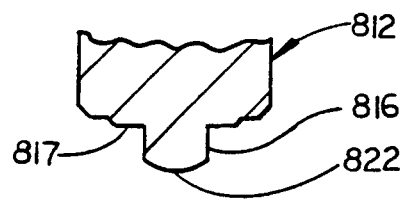
FIG. 129   FIG. 130
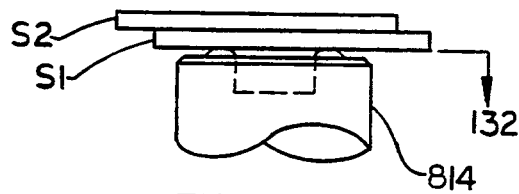
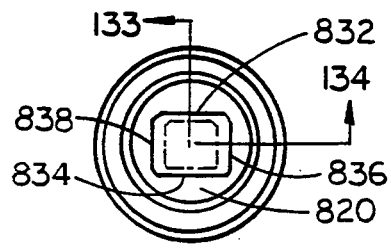
FIG. 131   FIG. 132
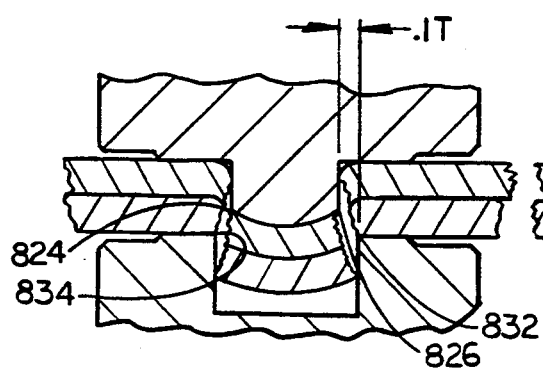
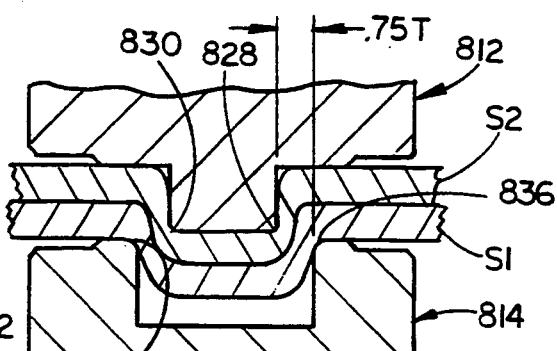
FIG. 133   FIG. 134
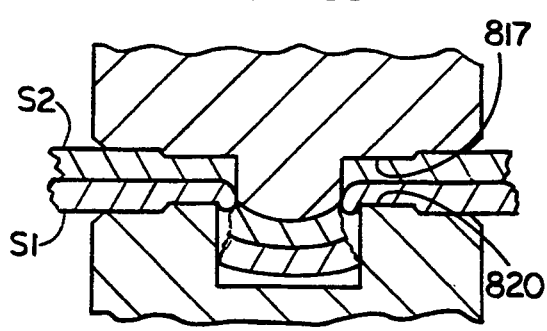
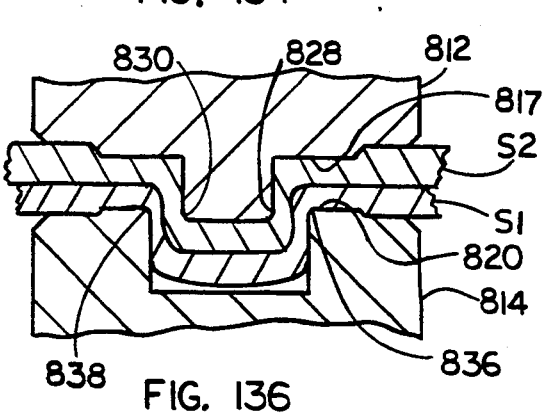
FIG. 135   FIG. 136

METHOD FOR FORMING A CLINCH JOINT

This is a divisional of application U.S. Ser. No. 07/764,188, filed on Sep. 23, 1991, of Louis C. Schleicher for Clinch Joint And Method And Apparatus For Forming, now U.S. Pat. No. 5,305,517.

TECHNICAL FIELD

This invention relates to fastening sheets of deformable material together and more particularly to clinch joints and methods and apparatus for forming clinch joints of both the leak proof and lanced type joints.

BACKGROUND ART

Clinch joints for fastening sheets of deformable material such as sheet metal or the like have been used for over one hundred years. Various lanced clinch sheet metal joints are used today which are very similar in design as shown in U.S. Pat. No. 56,494—Gordon, issued in 1866. Over the years, clinching has experienced limited commercial utilization. Currently the most popular method of fastening overlapping segments of sheet metal together is spot welding. Spot welding poses problems, particularly in certain applications such as when using dissimilar metals, metals having protective coatings, metals with different thicknesses or hard to weld materials. Clinch joints are not problem free either and whether to use a spot weld or a clinch joint must be determined on an application by application basis. Clinch joints of the lanced variety shear the metal exposing the central portion of the sheet to the atmosphere. A lanced joint is not suitable when a leak proof joint is necessary, or where the metal sheets have corrosion resistant coatings or the joint must be pressure-tight, such as a beverage can tab top attachment.

Leak proof clinch joints are well known, but have yet to experience wide spread commercial uses. Leak proof clinch joints of a conventional design are shown in U.S. Pat. Nos. 3,359,935, Rosbottom; 3,579,809, Wolf; 4,459,735, Sawdon; and described in detail in SAE Technical Paper, A New Mechanical Joining Technique for Steel Compared to Spot Welding, J. M. Sawhill and S. E. Sawdon, No. 830128. Conventional leak proof clinch joints are formed by simultaneously drawing a pair of cup-shaped cavities nested one within the other between a punch and die. Once the cavities are drawn, the spot forming the central region of the cavity is squeezed axially to radially deform and interlock the nested cavities.

When forming clinch joints of either the lanced or leak proof type, it is important to accurately control the manufacturing and tolerances of the punch and die assembly used and to carefully maintain alignment. Many die assemblies are formed of a series of die segments which are outwardly radially biasable as the central spot of the clinch joint is axially compressed between a punch and an anvil. During the drawing and squeezing of the spot operation, very significant axial load is exerted on the die segments. When the die segments are massive, such as the hinge die segments utilized in Sawdon, axial load is not a problem. However, when a flexible die assembly is used, such as the one piece die button, as shown in U.S. Pat. No. 4,208,776, Schleicher or U.S. Pat. No. 4,569,111, Mutou when fabricated by assembly of the type illustrated in U.S. Pat. No. 4,614,017, Eckold, die segments break periodically if the segments are made very flexible and tend to hinder spot expansion if the die segments are stiff.

In order to minimize the complexity of the punch and die assembly, there have been several attempts to form clinch joints using a solid punch in combination with a solid non-radially expandable die set. One such example is U.S. Pat. No. 4,394,794, Shirey, which utilizes a dovetail shaped slot in the die in which the clinch joint once formed must be removed from the die transversely. Another example of a solid punch and die lance-type joint and forming apparatus is shown in Italian patent 526042, Rosca, which lances and subsequently deforms a joint central spot between the punch and die.

A leak proof joint using a solid punch and die is illustrated in U.S. Pat. No. 3,579,809, Wolf. Joints of this type tend to be good in shear strength or alternatively good in peel strength, but not strong in both due to the design compromises inherent with making a symmetrical joint.

DISCLOSURE OF THE INVENTION

An object of the present invention is to provide an apparatus for forming a clinch joint using a solid punch and a solid non-radially expandable die to facilitate the simple and dependable formation of clinch joints.

Another object of the present invention is to provide a clinch joint and an apparatus and method for the formation of same where the clinch joint is relatively insensitive to variations in sheet metal thickness.

Another object of the present invention is to provide a clinch joint which is strong in both the shear and the peel modes. These and other objects, advantages and features of the invention become more apparent upon review of the accompanying specification and drawings.

Accordingly, an apparatus for forming a clinch joint between a plurality of sheets of deformable material is provided. The apparatus includes a die assembly having a central axis at die face normal to the axis and die recess having a floor and a plurality of generally vertical walls extending between the floor and the die face. The walls are spaced apart and securely connected together to prevent relative movement therebetween during the formation of the clinch joint. A punch is provided having a solid punch end sized to fit within the die recess when aligned coaxially therewith. The punch has a punch end in cooperation with the sheets of deformable material to draw the material into the die recess as the joint is formed. Clearance between the punch end and the die recess is provided relative to the thickness of the sheets of overlapped material in which the joint is to be formed in order to provide optimal joint shear and peel strength characteristics.

In one preferred embodiment of the invention, a lance type joint is provided in which a plurality of non-intersecting slits are sheared and the overlapped material between the corresponding cutting edges on the punch and die. The clearance provided between these cutting edges exceeds 0.08 times the thickest of the plurality of sheets.

In an alternative joint embodiment, a lance type joint is formed by shearing a plurality of non-intersecting slits between the cutting edges of the punch and the die. The non-intersecting slits are provided with a clearance which is lowest adjacent the center portion of the corresponding cutting edges and becomes greater moving in either direction away from the center.

Another alternative embodiment forms a lance type joint having a central spot defined between a plurality of non-intersecting slits sheared in the overlapping sheets of deformable material. A central spot is connected to the remainder of the sheets by a plurality of webs spaced between the ends of adjacent slits. The webs are formed generally vertically in order to further interlock the sheets to increase joint strength.

Yet another embodiment of the invention relates to a leak proof clinch joint and method and apparatus for forming same. The leak proof joint is formed in a plurality of overlapping sheets of deformable material. A series of nested cups are simultaneously drawn into the overlapping portion of the sheets between a die and a punch. The radial clearance between the punch and the die varies circumaxially about the joint thereby causing the cup wall regions to vary in thickness forming a plurality of thin wall sections and a plurality of alternately spaced relatively thick wall sections. A leak proof joint can be made of this type utilizing a solid non-radially expandable die and a solid punch projection wherein the joint has relatively little variation in strength due to changes in material thickness.

BRIEF DESCRIPTION OF THE DRAWINGS

FIGS. 1–3 illustrate a plan, transverse cross-sectional, and longitudinal cross-sectional view of a first joint embodiment;

FIGS. 4 and 5 are plan and transverse cross-sectional views of a second joint embodiment;

FIGS. 6 and 7 are plan and transverse cross-sectional views of a third joint embodiment;

FIGS. 17–19 illustrate a plan, transverse cross-sectional and longitudinal cross-sectional view of a seventh joint embodiment;

FIGS. 20–22 illustrate a plan, transverse cross-sectional and longitudinal cross-sectional view of an eighth joint embodiment;

FIGS. 23–25 illustrate a plan, transverse cross-sectional and longitudinal cross-sectional view of a ninth joint embodiment;

FIGS. 26–28 illustrate a plan, transverse cross-sectional and longitudinal cross-sectional view of a tenth joint embodiment;

FIGS. 29–31 illustrate a plan, transverse cross-sectional and longitudinal cross-sectional view of an eleventh joint embodiment;

FIGS. 32–34 illustrate a plan, transverse cross-sectional and longitudinal cross-sectional view of an twelfth joint embodiment;

FIGS. 45–49 illustrate a plan view and a series of radially spaced cross-sectional views of a fifteenth joint embodiment;

FIGS. 50–53 are plan views of additional, alternative joint embodiments;

FIGS. 54–60 illustrate a first tool embodiment and a sequential series of cross-sectional views showing their use and the formation of the first joint embodiment;

FIGS. 67–72 illustrate a third tool embodiment and a sequential series of cross-sectional views showing the formation of the third joint embodiment;

FIGS. 89–96 illustrate a sixth tool embodiment and a sequential series of cross-sectional views showing the formation of the sixth joint embodiment;

FIGS. 105–112 illustrate an eighth tool embodiment and a sequential series of cross-sectional views showing the formation of the eighth joint embodiment;

FIGS. 121–128 illustrate a tenth tool embodiment and a sequential series of cross-sectional views showing the formation of the tenth joint embodiment;

FIGS. 129–136 illustrate an eleventh tool embodiment and a sequential series of cross-sectional views showing the formation of the eleventh joint embodiment;

Figures 8, 9, 10:
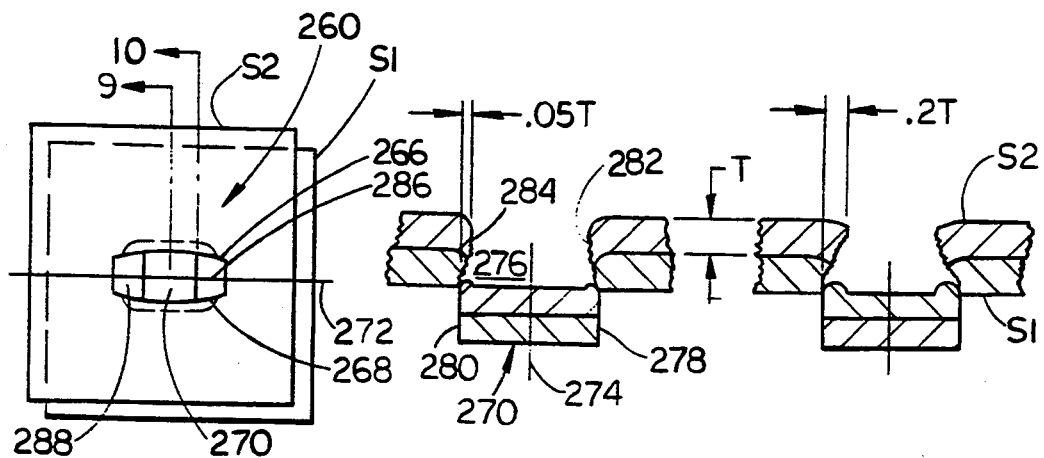
FIGS. 8–10 illustrate a plan view and two transverse cross-sectional views of a fourth joint embodiment.

Best Modes for Carrying out the Invention

Constant Clearance Lance-Joint

FIG. 1 illustrates a first joint embodiment 170 formed in a first and second sheet S1 and S2 of a deformable material such as sheet metal and the like. The sheets are locally overlapped conformably engaging one another along a common plane or interface surface. A pair of non-intersecting slits 176 and 178 are formed in the overlapping sheets to define a central spot 180 aligned along longitudinal axis 182. Central spot 180 is deformed out of the plane of the sheets along the center axis 184 shown at FIGS. 2 and 3. The center spot protrudes at least partially beyond the outer surface of the first sheet S1 and forming a recessed cavity 186 projecting into the outer surface of second sheet S2. The outboard marginal edges 188 and 190 are spaced from the center axis 184 a distance which is greater than the corresponding distance to the adjacent wall region 192, 194 of the central cavity, respectively, to provide the mechanical interlock preventing the central spot 180 from being withdrawn from the cavity. The amount of interference which can be achieved utilizing the present design is a function of material thickness in that multiple sheets of material are being joined in a dimension where T represents the thickest of the sheets. The amount of interference represented by the difference between the spacing of spot outer wall 190 and cavity inner wall 194 is in excess of 0.08 T and most preferably 0.1 T. This dimension is double what is typically used in forming lance type joints using an expandable die.

Joint 170 can be formed in a very simple and inexpensive fixed die with good strength characteristics. Reducing the amount of clearance between the central spot and the cavity tends to decrease joint strength. Further increasing the amount of clearance beyond 0.1 T would significantly would make shearing inconsistent as the material want to draw into the cavity forming nested cups. In the first joint embodiment, a central spot 180 is squeezed between a punch and a die anvil to outwardly extrude material of the spot into conformity with a die recess forming the well defined generally vertical walls 188 and 190 illustrated in FIG. 2. Center spot 180 is connected to the remainder of the sheets by a pair of web portions 196 and 198. Web portions are inclined at approximately 45° in the longitudinal side elevation shown in FIG. 3 as is typical of the prior art.

FIGS. 4 and 5 illustrate a second joint embodiment 200 which is formed in a first and second sheet of deformable material, S1 and S2. A pair of slits 206, 208 are formed in the overlapping sheets to define a central spot 210 generally aligned along longitudinal joint axis 212. Central spot 210 is deformed out of the plane of the sheets along central axis 214 as illustrated in the transverse cross-sectional view shown in FIG. 5. The central spot 210 projects beyond the outer surface sheet S1 and forms a cavity 216 which projects into the outer surface of second sheet S2. A portion of central spot 210 which projects out of sheet S1 has relatively irregular outer walls 218 and 220. Cavity 216 has very well-defined vertical inner walls 222 and 224. The first and second sheets have a region adjacent to and immediately outboard of the slits which is plastically deformed to aid a punch and die during joint formation to inwardly extrude the material into conformity with the punch and to provide well-defined vertical cavity walls 222 and 224. As a result of this deformation, a series of depressed regions 226 and 228 are formed in the sheets as illustrated in FIGS. 4 and 5.

A third joint embodiment 230 is illustrated in FIGS. 6 and 7. Third joint 230 is again formed in a pair of overlapping sheets, S1 and S2. Of course, it should be appreciated that more than two sheets cars be used when forming any of the various joints described, however, two sheets are being utilized for simplicity purposes. As in the first and second embodiment, a pair of slits 236 and 238 are formed in the overlapping portion of the sheets to define a central spot 240 lying along a longitudinal axis 242. The central spot is deformed out of the plane of the sheets along a vertical axis 244 creating a cavity 246 projecting into the surface of second sheet S2. A portion of the central spot 240 projecting beyond the outer surface of first sheet S1 has well-defined vertical outer walls 248 and 250 which conform substantially to the shape of the die recess used in one of the joints. The cavity interior walls 252 and 254 are likewise vertical and well-defined conforming to the outer profile of a punch used to form the joint.

As the joint is formed, the central spot 240 is squeezed between a punch and a die anvil and the regions of the overlapping sheets immediately outboard of the slits is likewise squeezed between the punch and die causing the material therebetween to plastically deform and extrude inwardly leaving recesses 256 and 258 behind and a pair of corresponding recesses on the outer side of the first sheet S1.

Lanced Variable Clearance Joint

FIGS. 8 through 16 illustrate three lance type joints which utilize variable shear clearance between the punch and the die. Fourth joint embodiment 260 is formed in a pair of overlapping sheets S1 and S2 having a pair of non-intersecting slits 266 and 268 formed therein to define a central spot 270 aligned along longitudinal joint axis 272. In top plan view shown at FIG. 8, slits 266 and 268 are outwardly concave relative to longitudinal axis 272 as a result of the use of a correspondingly shaped punch having convex cutting edges. As illustrated in FIGS. 9 and 10, the central spot 270 is deformed out of the plane of the sheets along vertical axis 274 to define a recess cavity 276. Central spot 270 has outer walls 278 and 280 which are well-defined and generally vertical extending parallel to the longitudinal axis 272 of the joint. Cavity 276 has relatively irregular inner walls 282 and 284 which define an opening which is smaller than the central spot 270 to prevent the formed joint from coming apart.

The amount of interference between the outer wall of the spot and the corresponding adjacent inner wall of the cavity defines an interference dimension X which varies longitudinally. At the midpoint of the joint as illustrated in FIG. 9 cross-section, the amount of interference X is equal to approximately 0.05 T where T is the thickness of the thicker of the plurality of sheets forming the overlapping section. Moving longitudinally outboard from the midpoint of the joint, the clearance dimension X gradually increases reaching a maximum dimension adjacent webs 286 and 288 when the clearance becomes so large that a sheet no longer tears rather it is drawn out of the plane of the sheets. At section 10, shown in transverse cross-sectional view, the interference dimension X is reaches 0.2 T resulting in a very large amount of mechanical interference to securely hold the joint together. When making a joint utilizing variable shear clearance between the cutting edge on the punch and the corresponding cutting edge in the die, the shear can be consistently initiated at the low clearance region and the slit can be propagated into the high clearance region once it is initially started.

A joint utilizing the variable clearance design is particularly useful in situations in which the sheet metal clearance might vary slightly. The'low clearance region in the midpoint of each slit will consistently shear at a wide range of sheet metal thickness. As the clearance increases moving either direction away from the slit mid point, the slit will propagate until the clearance reaches a level in which the material begins to draw. In the fourth drawing embodiment, joint 260 has center spot 270 squeezed between the punch end and the die anvil to cause the center spot to be plastically extruded outwardly as illustrated in FIGS. 9 and 10. In the FIG. 8 plan view, the outer boundary of the central spot is illustrated in a dotted outline.

Figures 11, 12, 13:
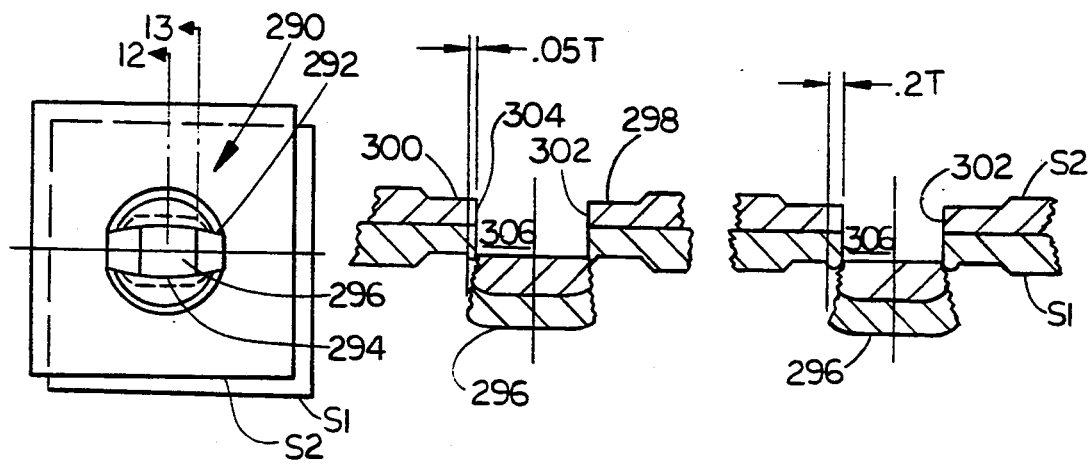
FIGS. 11–13 illustrate a plan view and two transverse cross-sectional views of a fifth joint embodiment.

A fifth joint embodiment 290 illustrated in FIGS. 11–13 is similar to joint 260 in that it has a variable shear clearance between the punch and the die set forming a pair of arcuate slits 292 and 294 defining a center spot 296 which is deformed out of the plane of the sheets in a manner previously described. Joint 290, rather than having the center spot 296 squeezed between the punch and then die anvil, squeezes the sheets together immediately outboard of the slits to form a series of recesses 298 and 300 resulting in the material plastically extruding inwardly into conformity with the punch to create a pair of generally vertical inner walls 302 and 304 defining recessed cavity 306.

Figures 14, 15, 16:
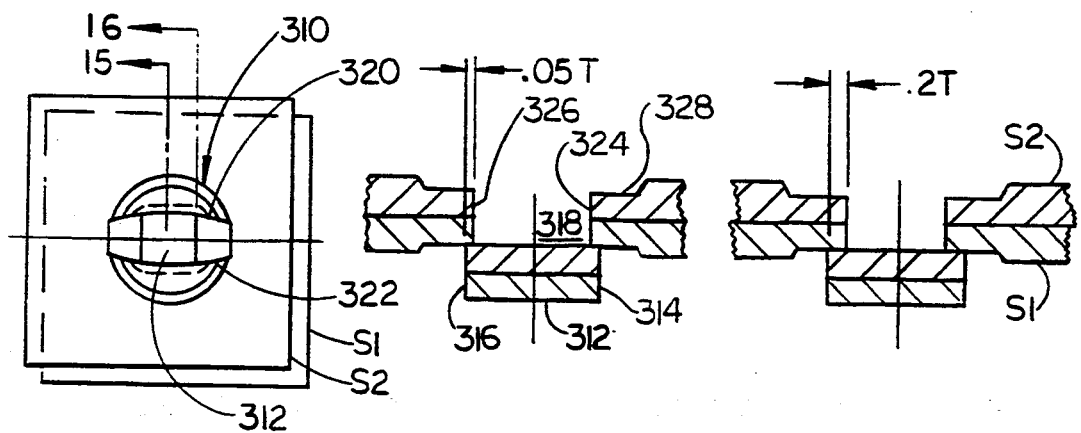
FIGS. 14–16 illustrate a plan view and two transverse cross-sectional views of a sixth joint embodiment.

A sixth joint embodiment 310 is illustrated in FIGS. 14–16. Joint 310 again has a variable shear dimension similar to joint 260 and joint 290 illustrated in FIGS. 8–13. The joint of the sixth embodiment, however, has a central spot 312 which is squeezed in a manner similar to joint 230, as shown in FIG. 6. Center spot 312 has well-defined vertical outer walls 314 and 316. Cavity 318 is formed as two non-intersecting slits 320 and 322 are formed and a center spot is projected out of the plane of the sheets. Cavity 318 is bounded by inner cavity walls 324 and 326. The cavity inner walls are generally vertical as a result of the material immediately outboard of the slits being squeezed between the punch and the die to plastically deform the material and extrude it radially inwardly into conformity with the punch. A series of moon-shaped recesses 328 are formed on the first and second side of the overlap sheet immediately outboard the slits as illustrated and as previously described with reference to FIGS. 6 and 7.

Leak Proof Joint With Variable Clearance

FIGS. 17–25 illustrate three leak proof joint embodiments which have variable die clearance. A seventh joint embodiment 330 is shown in FIGS. 17–19. Leak proof joint 330 is formed in an overlapping plurality of sheets of deformable material. In the particular joint illustrated, a first sheet S1 and second sheet S2 are overlapped in a coplanar relationship. In the embodiment illustrated, both sheets have an initial thickness T, however, it should be appreciated that the sheets can have different thicknesses. Using a punch and a die, a pair of cups are simultaneously drawn in the overlapping portion of the sheets. First sheet S1 has a first cup 336 formed therein and a second sheet S2 has a second cup 338 formed therein which are nested snugly, one within the other as illustrated in FIGS. 18 and 19 cross-sectional views. First and second cups 336 and 338 are coaxially aligned along a central generically common axis 340. The radial die clearance between the punch and the recessed cavity of the die determine the outer dimensions of the first cup and the inner dimensions of the second cup.

As the joint is formed, the material in the overlapping sections are deformed out of the plane and squeezed between the punch and the die to securely interlock the nested cups to form a strong joint. A relatively thin clearance between the punch and the die result in a thin section which is good for achieving a mechanical lock to resist pull-out or peel, but the thin section results in a relatively weak joint when loaded in shear. The leak proof joint of the present invention utilizes a variable clearance between the punch and the die to cause the cup wall region 342 and 344 to vary in thickness at various circumaxial locations about the common axis of the joint.

Joint 330 is made utilizing a circular die recess and a generally oval or cartouche shaped punch. A longitudinal section through the joint illustrated in FIG. 19 shows the two relatively thin wall section regions and a transverse cross-section in FIG. 18 illustrates two relatively thick wall regions which are alternatively radially spaced between the thin regions. The thick regions have a total combined wall thickness of 1 T where T represents the thickness of the material where two overlapped sheets of the same thickness are utilized. Of course, if materials of different thicknesses are used, the radial clearance should be selected which corresponds to the average of the two sheet metal thicknesses. The two relatively thick wall sections result in very strong walls which resist shear. The two relatively thin wall sections shown in FIG. 19 provide a good mechanical interlock between the walls which would resist pull out or peel. The thin wall sections have a combined wall thickness of 0.5 T.

It should be appreciated that these die clearances are designed for nominal thickness material and that material thickness will vary slightly in most applications. A joint of the present design with the variable radial clearance will insure a high quality joint and is relatively insensitive to variation of sheet metal thickness. In the specific embodiment illustrated in the joint 330, the exposed bottom portion 346 of first cup 336 is concave causing the center section of the cup to be thinner in the bottom peripheral corner. This design enables material to be concentrated in the corner to further strengthen the joint and to increase peel strength.

An eighth joint embodiment 350 as illustrated in FIGS. 20–22, is a leak proof joint constructed in a manner generally similar to joint 330, however, rather than squeezing the center spot forming the floor of the nested cups, the sheets surrounding the periphery are squeezed to radially inwardly extrude the material toward the joints on a line. Joint 350 is formed by overlapping sheets of material S1 and S2 which are locally conformably engaging one another along a generally flat plane. A pair of nested cups 352 and 354 are formed in the first and second sheets, S1 and S2, respectively, and are drawn out of the plane of the sheets along vertical axis 356 to define a projection extending beyond the outer surface of sheet S1 and a recessed cavity 358. The central cups each have a generally flat bottom and a vertical wall extending from the cup bottom to the cup periphery.

As previously described with reference to the seventh joint embodiment 330, the wall thickness varies circumaxially around the joint resulting in two relatively thick sections shown in FIG. 21, transverse cross-sectional view and two relatively thin wall sections shown in the FIG. 22, longitudinal cross-sectional view. During joint formation, the region outboard of the nested cup periphery is squeezed between the punch and the die forming a lower annular depression 360 and an upper annular depression, 362. As illustrated in FIGS. 21 and 22, the upper annular depression does not extend radially inward all of the way to cavity recess 358, but terminates short thereof a distance approximately 0.5 T. This distance provides a raised annular bead 364 immediately outboard of the recessed cavity between the recessed cavity and upper annular depression 362. The presence of annular bead 364 enables better inward radial penetration of material in sheet one increasing joint strength, particularly peel and pull-out strength.

A ninth joint embodiment 370 is illustrated in FIGS. 23–25. Joint 370 is formed in two overlapping sheets, S1 and S2. Joint 370 is similar to two previously described joints, 330 and 350, in that the leak proof joint has a plurality of nested cups simultaneously drawn in a plurality of overlapping sheets to form a series of nested cups having a wall thickness which varies circumaxially about the joint to define two relatively thick wall sections and two relatively thin wall sections. Joint 370, however, is squeezed together somewhat differently.

As illustrated in FIG. 24, first cup 372 and second cup 374 are aligned along common axis 376 to define a projection extending out of the plane of sheet S1 and a annular depression 378 projecting into the surface of sheet S2. The generally vertical wall which extends between the central floor of the nested cups extends upwardly to the respective cup periphery. The floor of both cups is squeezed axially between a punch and a die and outwardly radially extrude the material in the center spot of the joint. Simultaneously with the squeezing of the center spot, the region immediately outboard of the nested cups is squeezed between the punch and the die forming a pair of annular depressions 378 and 380 in the first and second sheets, respectively. By squeezing both these cups center spots 382 as well as the annular region of the sheets immediately surrounding the cups, a very secure joint can be achieved.

In the embodiment illustrated in FIGS. 23–25, it should be noted that while upper annular depression 380 is flat and extends radially inwardly all the way to the cup cavity 378, upper annular depression which terminates short of the cavity periphery, like that illustrated in joint 350, FIGS. 20–22, can similarly be used. The tooling required to make the flat depression 380 is slightly simpler since an annular groove does not have to be machined in an otherwise flat punch land face. It should also be noted that the concave exposed bottom portion, as illustrated in FIGS. 18–19, could also be used.

Each of the previously described leak proof joints utilizes a circular die and an oblong shaped punch to achieve a variable die clearance about the central axis of the joint. It should appreciated, of course, that a circular punch can be used in conjunction with an oval shaped die recess, as well as many other shapes, to achieve substantially the same result.

Lanced Joints with Interlocked Webs

FIGS. 26 through 53 illustrate a number of embodiments of a lanced type joint which have a series of non-intersecting slits formed through a plurality of the overlapping sheets of deformable material to define a central spot which is deformed out of the plane of the sheets. The center spot is connected to the remainder of the sheets by a plurality of webs alternatively spaced between the adjacent slits. Unlike the typical webs of the prior art which gradually incline upwardly as shown in FIG. 3, the webs of the present series of joints are generally vertical and are interlocked with one another to further enhance joint strength.

Joints 390, 420 and 450 illustrated in FIGS. 26, 29 and 32, respectively, are generally rectangular in shape each having a pair of spaced apart non-intersecting parallel slits defining a generally square central spot connected to the remainder of the sheets by a pair of generally vertical webs. The central spot is not only mechanically interlocked in the transverse direction, but is also mechanically interlocked in the longitudinal direction as a result of the relative deformation of the generally vertical web sections. The three joints 390, 420 and 450, differ only in the manner in which they are squeezed together.

Joint 390 is formed in two overlapping sheets of deformable material S1 and S2. Again, however, more than two sheets can be utilized. In the embodiment illustrated, the two overlapping sheets have a common initial thickness T, a pair of slits 392 and 394 are formed in the overlapping sheets to define a central spot 396 which is deformed axially out of the plane of the sheets along a vertical joint axis 398. Slits 392 and 394 extend parallel one another on opposite sides of a longitudinal joint axis 400. As illustrated in FIGS. 26–28, central spot 396 forms a generally rectangular projection extending out of the surface of sheet S1 which has a corresponding inlet square recessed cavity 402 formed therein. A pair of webs 404 and 406 connect a central spot to the remainder of the sheet. The webs shown in FIG. 27 are generally vertical and are deformed so each of the layers of the webs defined by sheets S1 and S2 are mechanically interlocked together. Preferably, the web total thickness measured in the longitudinal direction is 0.75 T where T is the average thickness of the two sheets.

FIG. 28 illustrates a transverse cross-sectional view of the joint 390 illustrating the mechanical interlock between the outboard walls 408 and 410 of the central spot 396 and corresponding inner walls 412 and 414 of the recess cavity 402. As illustrated, the center spot outer wall extends transversely beyond the inner most edge of the cavity inner wall by a distance approximately 0.1 T to achieve a good mechanical interlock. When calculating T for shear clearance in FIG. 28, T should be the thickest of the two sheets as opposed to the average thickness used to calculate combined wall thickness as described with reference to FIG. 27.

Joint 390 is securely held together by squeezing the center spot 396 between a punch end and a corresponding die cavity floor. As the center spot 396 is squeezed, the material of the spot is radially extruded outwardly, both in the transverse and longitudinal directions. The transversely extruded material of the center spot 396 forms the mechanical interlock illustrated in FIG. 28. As the material in the spot is extruded longitudinally, as shown in FIG. 27, the generally vertical webs 404 and 406 deform causing the two layers of the web to mechanically interlock as shown. As illustrated in FIG. 28, the floor of recessed cavity 402 defined by the surface of central spot 396 is slightly concave viewed along the longitudinal axis. This concavity causes the extruded material of the spot to concentrate more heavily on adjacent outer walls 408 and 410 which further enhances joint strength.

The eleventh joint embodiment 420 is illustrated in FIG. 29–31. Joint 420 is identical to joint 390 described previously, except that rather than squeezing the center spot 422, the region immediately surrounding the center spot is squeezed between the punch and the die forming a recess 424 in sheet S1 and 426 in sheet S2, to inwardly radially deform the material in the sheets into conformity with the punch projection. FIG. 30 is a longitudinal cross-section taken along the longitudinal axis 428 of the joint. Center spot 422 is deformed out of the plane of the sheets as previously described along a vertical axis 430 defining a pair of generally vertical webs 432 and 434 connecting these spots to the remainder of the sheet. As previously described with reference to joint 390, webs have a thickness measured along the longitudinal axis of 0.75 T where T is the average thickness of the two sheets or one half of the total thickness of the series of stacked sheets where more than two sheets are used. Each of the sheets form a layer in the web which become mechanically interlocked together as illustrated. The central cavity 436, in addition to having vertical end walls as shown in FIG. 30, has well defined vertical side walls 438 and 440. Sidewalls 438 and 440 are closer to central vertical axis 430 than corresponding outer walls 442 and 444 of the central spot 422, resulting in a mechanical interference of approximately 0.1 T as described with reference to FIG. 28 previously.

The twelfth joint embodiment 450 is illustrated in FIG. 32. This joint is again similar to joints 390 and 420 and FIGS. 26 and 29, respectively, except for the manner in which the joint is squeezed together. Joint 450 has a center spot 452 defined between the two lanced non-intersecting slits 454 and 456. The center spot is deformed out of the plane of the sheets along vertical axis 468 to define a projection extending beyond the plane of sheet S1 and a corresponding square recess 458 projecting into sheet S2 as illustrated. A pair of webs 460 and 462 connect the center spot 452 to the remainder of the sheets, each of the webs having a series of layers corresponding to the number of sheets forming the overlapped region of a plurality of sheets. As illustrated in FIG. 33, the webs are generally vertical and have a thickness of approximately 0.75 T where T is the average thickness when there are two sheets or one half total thickness when there are more than two sheets, as described previously.

Once the center spot 452 is lanced out of the plane of the sheets, both the center spot 452 and the area immediately surrounding the center spot are squeezed between the punch and the die to cause the center spot to radially extrude outwardly into conformity with the die recess and causing the material immediately surrounding the center spot to extrude radially inwardly into conformity with the punch projection to form a depressed region 464 in sheet S1 and depressed region 466 in sheet S2 adjacent the outer periphery of cavity 458. The outer walls of the spot and the inner walls of the cavity are well defined and generally vertical as illustrated in FIG. 34, resulting in a strong lance joint having very good shear characteristics when loaded along the longitudinal axis.

Figures 35, 36, 37:
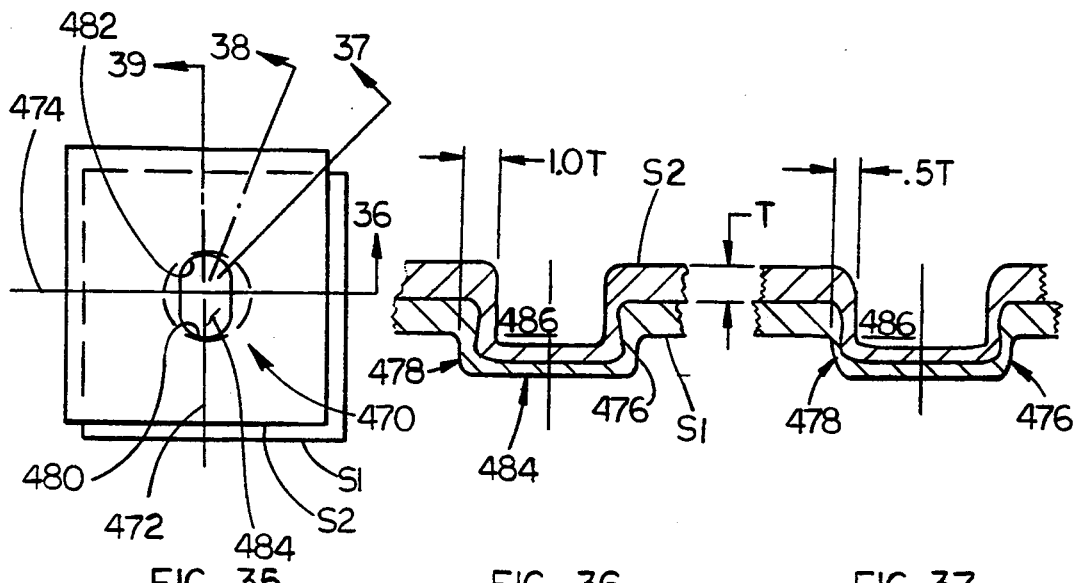
FIGS. 35–39 illustrate a plan view and a series of radially spaced cross-sectional views of a thirteenth joint embodiment.
Figures 40, 41, 42:
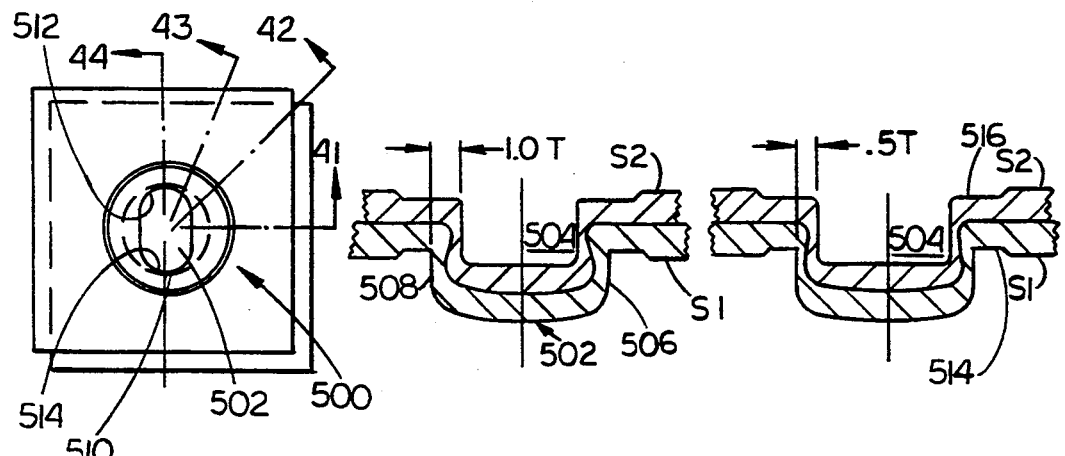
FIGS. 40–44 illustrate a plan view and a series of radially spaced cross-sectional views of a fourteenth joint embodiment.
Figure 43:
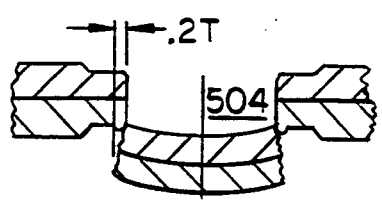
Figure 44:
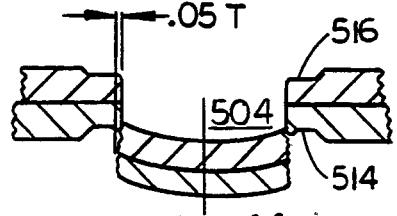
Figure 61:
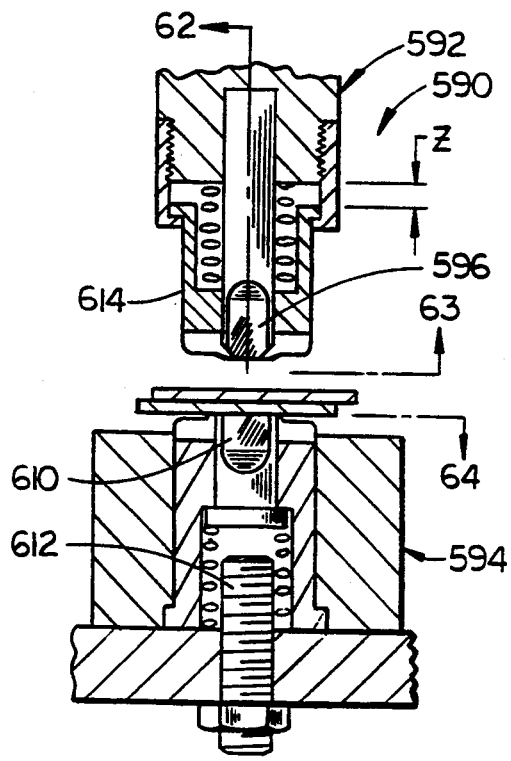
FIGS. 61–66 illustrate a second tool embodiment and a sequential series of cross-sectional views showing the formation of the second joint embodiment.
Figure 62:
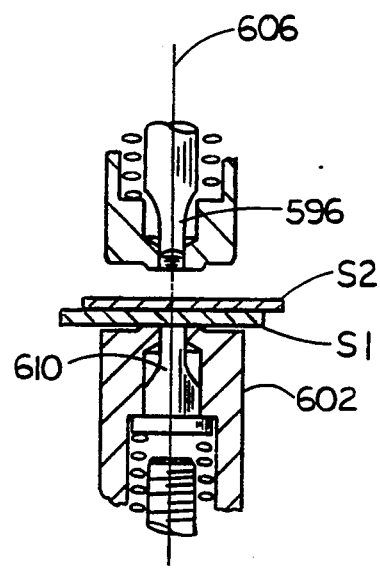
Figure 63:
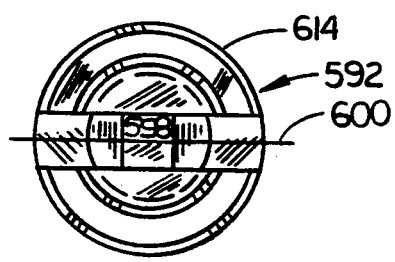
Figure 64:
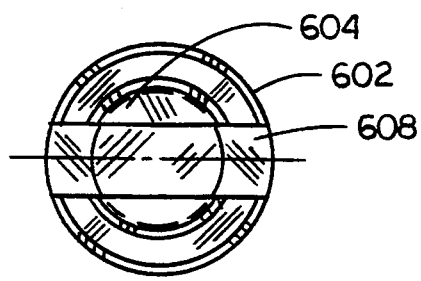

FIGS. 35, 40 and 45 illustrate a family of joints 470, 500 and 520, respectively, formed using a generally cartouche shaped punch and a circular die recess. The relative clearance between the punch and die is such that at any two minimum clearance regions at the longitudinal ends of the formed joint, the material is sheared. In the two minimum clearance regions which are spaced therebetween, the sheet material is drawn into generally vertical webs resulting in a very strong lance joint. This lance joint can be made with simple tooling and is relatively insensitive to variations in material thickness. Joints 470, 500 and 520 differ from one another in the manner in which the joints are squeezed together.

Figure 38:
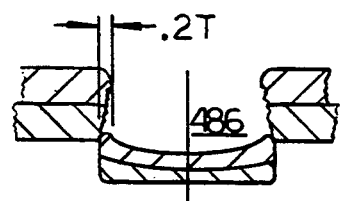
Figure 39:
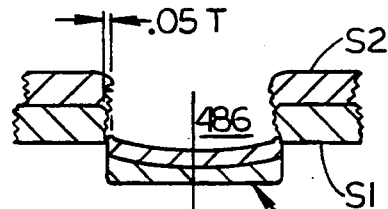

The thirteenth joint embodiment 470 shown in FIGS. 35–39 is formed in a pair of overlapping sheets S1 and S2, each having an initial thickness T. The joint is generally symmetrical about a longitudinal axis 472. FIG. 36 is a transverse cross-sectional view taken along section line 36 where the radial clearance between the punch and the die is at a maximum. FIG. 39 is a longitudinal cross-sectional view through the joint where the radial clearance between the punch and the die is at a minimum value. FIGS. 37 and 38 are cross-sectional views taken along intermediate section lines 37 and 38, illustrating how the radial clearance between the punch and die gradually varies circumaxially about the periphery of the joint.

When using two sheets of deformable material of equal thickness, the radial clearance between the punch and the die will vary from a maximum of 1.0 T as shown in FIG. 36 to a minimum of 0.05 T as shown in FIG. 39. The variable clearance will result in the formation of a pair of generally vertical webs 476 and 478 and a pair of intermediately spaced sheared non-intersecting slits 480 and 482 at the longitudinal ends of joint center spot 484. As the punch and die are moved axially together when the joint is formed, center spot 484 is deformed out of the plane of sheets S1 and S2 forming a projection extending beyond the outer surface of sheet S1 and a recess cavity 486 extending into the surface of sheet S2. As the radial clearance between the punch and the die varies about the periphery of the joint, clearance will decrease to a level at which a transition will be made between a drawn web and a sheared slit. In the joint illustrated in FIG. 35, this transition occurs between sections 37 and 38.

In order to securely interlock the two sheets together, the two layers forming center spot 484 are squeezed axially together causing the material in the spot to radially extrude outwardly in conformity with the die cavity. This causes the center spot to become greater than the size of the cavity opening and the sheared region shown in FIGS. 38 and 39 and further causes the center spot to grow longitudinally, causing the two layers making up the vertical webs to also interlock. Generally vertical interlocked web design results in very good shear and peel strength when the joint is loaded along the longitudinal axis 474. Joints 470, 500 and 520, as a result of their use of a variable clearance between the punch and die, which results in a variable clearance between the outer wall of the spot and the inner wall of the recessed cavity, enables the joint to have very good strength characteristics in spite of variations in sheet thickness.

The fourteenth joint embodiment 500 is shown in FIGS. 40–44. Joint 500 is a lance type clinch joint which is very similar to joint 470 in FIG. 35. Joint 500 is formed using a cartouche shaped punch and a circular die recess to cause the die clearance to vary about the periphery of the joint. A transverse section through the joint taken along section line 41 shows central spot 502 protruding from the outer surface of sheet S1 along the joint central axis defining a recessed cavity 504 extending into the outer surface sheet S2. Central spot 502 is connected to the remainder of the sheets by a pair of generally vertical webs 506 and 508 which have a thickness of 1.0 T where T is the average thickness of the two sheets forming the joint. Moving around the periphery of the joint section 44 illustrates how the webs become thinner as the die clearance varies resulting in shearing in the region between section lines 42 and 43.

A pair of non-intersecting semi-circular slits 510 and 512 are sheared through the overlapping sheets of deformable material adjacent the longitudinal ends of center spot 502 as shown in FIG. 40 in a manner previously described with reference to joint 470. In joint 500, rather than squeezing a central spot, a region immediately outboard of the center spot 502 is squeezed between the punch and the die causing the material in the sheets to radially extrude into conformity to the shape of the punch projection. As a result of squeezing the area outboard of the central spot 502, a lower indentation 514 is formed in sheet S1 and an upper indentation 516 is formed in sheet S2.

Joint 520, as illustrated in FIGS. 45–49 is similar to joints 470 and 500 described previously, except both the center spot 522 and the area of the sheets S1 and S2 immediately outboard of the center spots are simultaneously squeezed between a punch and a die during the joint formation to securely interlock the sheets. Center spot 522 projects axially out of the plane of the sheets to form a protrusion extending beyond the outer surface of sheet S2 and the corresponding recessed cavity 524 extending into the surface of sheet S2. Center spot 522 is defined between a pair of semi-circular non-intersecting arcuate slits 526 and 528 which transverse the ends of the central spot 522 on opposite sides of the longitudinal axis and a pair of generally vertical webs 530 and 532 extending vertically between the central spot 522 and the adjacent portions of the overlapped sheets as illustrated in FIG. 46.

Consistent with joints 470 and 500 described previously, the radial clearance between the punch and die varies about the periphery of the joint causing the radial dimension between the outer wall of the central spot projection and the inner wall of the central recess to vary in thickness circumaxially between a maximum value of approximately 1.0 T along the transverse section to a minimum value of 0.05 T along the longitudinal section. Joint 520 is securely held together by squeezing a center spot 522 between the punch end and a die floor to outwardly, radially extrude the spot material, causing the wall ends to interlock as shown in FIG. 46 as well as causing the spot to extend radially outwardly beyond the inner wall of the cavity in the sheared regions. In addition to squeezing the spot, the outboard region of the overlapping sheets immediately surrounding the center spot is squeezed together between the punch and the die causing the material of the sheets to radially extrude inwardly into conformity with the punch projection to further enhance joint strength. As the material in the sheets immediately surrounding the central spot is squeezed, a pair of depressions 534 and 536 are formed as illustrated in FIG. 46.

As previously indicated, joints 470, 500 and 520 can alternatively each be formed using a circular punch in an oval or cartouche shaped die cavity. Joint 540 illustrated in FIG. 50, top and plan view, is precisely such a joint. Of course it should be further appreciated that the joint can be formed in a manner similar to joint 470, 500 or 520 in that a center spot can be squeezed as in joint 470, the outboard region of the sheets can be squeezed like joint 500 or both the outboard region and the center spot can be squeezed together between the punch and the die like joint 520 in order to securely interlock the correlated sheets of the joint together. Joint 540 will achieve a variable clearance between the punch and die which will have two minimum regions in which the material of the sheets will be sheared and two maximum clearance regions in which the material of the sheets will be drawn into generally vertical webs. Ideally, as previously described, the maximum clearance will be 1.0 T where T is the average material thickness when two sheets are used. A minimum clearance of 0.05 T is ideally provided in the minimum clearance region, as described with reference to the previous embodiment.

FIG. 52 illustrates another alternative lance type joint 542 having a variable clearance resulting in two minimum clearance regions. The non-intersecting slits and the clearance region between the punch and the die which form a pair of non-intersecting slits and two relatively large clearance regions which result in the formation of a pair of generally vertical webs extending from the central spot to the remainder of the overlapping sheets. As illustrated in joint 542, the recess and the punch can be generally rectangular in shape and the outer periphery of central spot and the corresponding recess and the die can be generally dog bone in shape in order to achieve two minimum clearance shear sections and two maximum clearance drawing sections with the clearance radially appearing gradually about the periphery of the joint.

FIGS. 51 and 53 illustrate a pair of lance type joints 544 and 546 which have four non-intersecting slits which are sheared between a punch and a die and four alternately spaced webs which are generally vertical and are drawn between the punch and the die as the joint is formed. Joint 544 utilizes a circular cylindrical punch and a generally square die recess to form the joint illustrated in FIG. 51. FIG. 53 illustrates a similar joint 546 formed utilizing a generally square cylindrical punch having slightly radiused corners and a circular cylindrical die recess to form a generally square central cavity having four webs along the four straight cavity walls and four slits adjacent the corners.

Common to all of the joints illustrated in FIGS. 35–53 is the characteristic that the lance type joint is provided having a plurality of non-intersecting slits and a plurality of generally vertical webs where the clearance between the inner surface of the central cavity and the outer surface of the central spot projection varies about the periphery of the joint to form a plurality of minimum clearance regions and a plurality of alternately spaced larger clearance regions. The gradual variation in clearance creates a series of alternatively spaced slits and webs. Joints of this type are ideally suited for fabrication using simple solid punches and dies which do not necessarily have to be designed to be radially expandable.

Method and Apparatus for Forming a Constant Clearance Lance Joint

FIGS. 54–60 illustrate an apparatus 560 used to form the lance type clinch joint 170 shown in FIGS. 1–3. Apparatus 560 is made up of a coaxially aligned punch 562 and die 564 between which a pair of overlapped sheets of deformable material S1 and S2 can be oriented in order to form a lance type joint therein. Punch 562 is provided with a punch projection 566 having a generally planar punch end 568. Punch projection 566 is aligned along a longitudinal joint axis 570 and has a pair of elongated cutting edges 572 and 574 extending parallel to longitudinal axis 570. Die 564 is provided with a generally planar die face 576 which is in a plane generally perpendicular to a common die axis 578. Formed in the die face 576 is a die recess 580 having a floor 582 for cooperation with punch end 568. Die recess 580 has a pair of vertical walls 584 and 586 extending from die floor 582 to die face 576. At the junction of vertical walls 584, 586 and the die face 576, there are a pair of sharp cutting edges 588 and 590 for cooperation with the cutting edges 572 and 574 on the punch. As best shown in FIG. 58, the punch and die cutting edges are spaced apart a distance C which is selected to correspond to the thickness of the material in which the joint is to be formed, as described previously with reference to joint 170. FIGS. 58–60 illustrate a sequential series of cross-sectional views taken along the longitudinal axis of the joint showing the joint being formed.

In FIG. 58, sheets of deformable material S1 and S2 are shown placed between the coaxially aligned punch 562 and die 564 which have just begun to move together, causing punch projection 566 to begin to penetrate the overlapping stacked sheets of material. Once the punch projection has penetrated the sheets a distance P illustrated, a series of cracks will propagate extending between the sharp corners of the punch cutting edges and the corresponding sharp corners provided by the die cutting edges. When clearance dimension C is properly selected relative to the material and material thickness T, the cracks will tear diagonally as illustrated in FIG. 58. Further movement of the punch axially, as shown in FIG. 59, will cause the central spot material located between the two lance slits to be formed out of the plane of the sheets into the die recess. Further advancement of the punch relative to the die, as shown in FIG. 60, causes the material in the central spot to be plastically deformed and extruded transversely to fill the die recess 580 causing the spot material to conform to the contour of the die recess walls 584 and 586. With the joint fully formed, the die is opened and the finished part can be removed.

An apparatus of the present invention is very simple to manufacture as both the punch and the die are solid and do not have radially expandable or contractible members. It should be appreciated, however, that a spring loaded external stripper or a spring loaded anvil can be placed in the die to facilitate the easy removal of the joint.

Apparatus 590, illustrated in FIGS. 61–66, is designed to form lance type joint 200 illustrated in FIGS. 4–5. As mentioned with reference to apparatus 560, the punch and die pair may include spring loaded strippers and spring loaded die anvil. The apparatus 590 embodiment includes a coaxially aligned punch assembly 592 and a die assembly 594.

Punch assembly 592 includes a punch 596 having a punch end 598 longitudinally aligned along the longitudinal axis 600 of the joint to be formed. Like the previous embodiment, punch 596 has a pair of cutting edges extending parallel to and spaced from the joint longitudinal axis 600. Die assembly 594 includes a die 602 having a generally flat die face 604 which is in a plane perpendicular to the common vertical axis of the punch and die 606. Die 602 has a longitudinally aligned die recess 608 formed therein. The die floor is formed by a spring loaded anvil 610 which is initially biased in the up position by a spring and is shiftable axially downwardly by the punch. A stop 612 is provided which can be used to limit the downward movement of the anvil 610.

Figure 65:
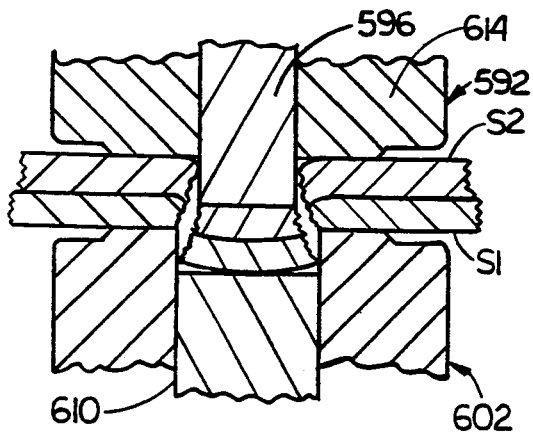
Figure 66:
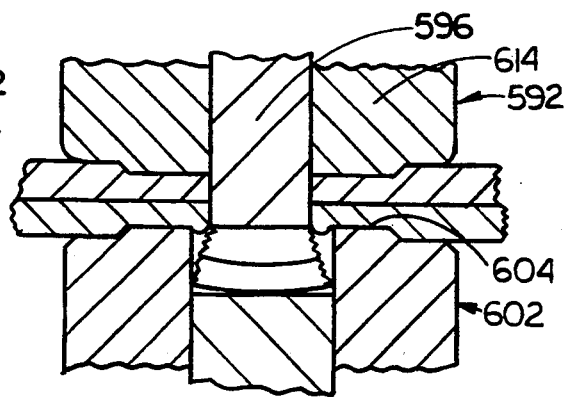
Figure 73:
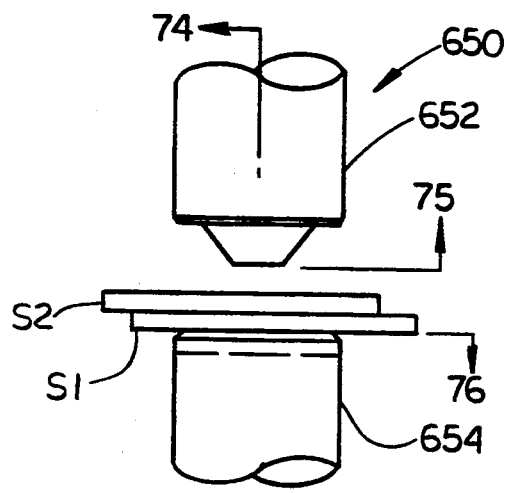
FIGS. 73–80 illustrate a fourth tool embodiment and a sequential series of cross-sectional views showing the formation of the fourth joint embodiment.
Figure 74:
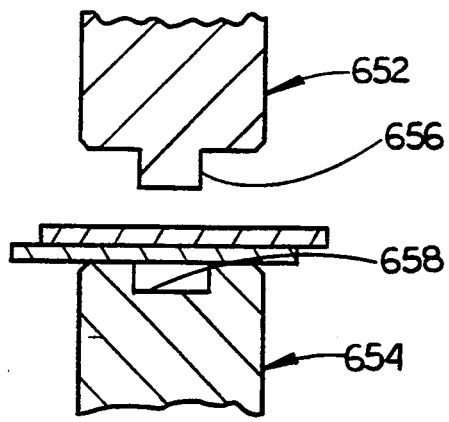

When joint 200, as shown in FIG. 4, is formed using apparatus 590, stop 610 is backed up sufficiently so that the anvil will not bottom out. However, when joint 230, as shown in FIG. 6 is made, the stop will be adjusted in order to squeeze the central spot between the punch and the anvil. As illustrated in FIGS. 65 and 66, when joint 200 is made using apparatus 590, initial movement of the punch 596 relative to the die 602 will cause two non-intersecting slits to be lanced through the overlapped sheets and the center spot therebetween to be deformed out of the planes of the sheets. Punch coining die 614 moves axially relative to punch 596 within a limited range Z illustrated in FIG. 61. As best shown in FIG. 66, once punch coining die has bottomed out relative to the punch, further movement of the punch assembly causes the coining die 614 to axially squeeze the sheets of overlapped material S1 and S2 between the punch coining die 614 and die face 604, causing the material therebetween to radially extrude inwardly into conformity with the end of the punch 596.

The third apparatus embodiment 620 is illustrated in FIGS. 67–72 and is used in forming the third joint embodiment 230 as shown in FIGS. 6 and 7. Apparatus 620 comprises a coaxially aligned punch 622 and die 624. Punch 622 is provided with a punch projection 626 which fits with a corresponding die recess 628 formed in die 624. Punch projection 626 has a punch face 630 and a pair of cutting edges 632 and 634 formed thereon for cooperation with corresponding cutting edges 636 and 638 formed in the die 624 on opposite sides of the die recess 628. Punch 622 and die 624 are aligned along the common generally vertical axis, with the punch projection and the die recess aligned along a longitudinal joint axis 640. The cooperating cutting edges of the punch and die are spaced apart a clearance distance C which is preferably in excess of 0.08 T where T is the thickness of the thicker of the two overlapped sheets S1 and S2. Most preferably, clearance between the punch and the die will be approximately 0.1 T.

Die 624 is provided with a die face 642 which lies in a plane generally perpendicular to the die axis. Punch 622 is provided with corresponding punch coining face 644 to squeeze the region of the overlapping sheets immediately outboard of the lanced non-intersecting slits together between the punch and the die.

With continuing reference to FIGS. 71 and 72, the punch is shown penetrating the overlapping sheets sufficiently to lance a pair of non-intersecting slits and to push the material therebetween into the recessed die cavity. Further axial movement of the punch relative to the die causes the material of the central spot to be squeezed between the punch end 630 and die floor 646. Simultaneously, the material between die face 642 and punch coining face 644 is squeezed together, causing the material therein to be deformed inwardly toward the joint longitudinal axis while the material in the central spot is extruded radially outwardly away from the longitudinal axis to form a secure joint as illustrated in FIG. 72. The punch and die are axially moved apart enabling the overlapping sheets of material with the joint formed therein to be removed from the apparatus.

Apparatus and Method for Forming a variable Clearance Lance Joint

Apparatus 650 shown in FIGS. 73–80 is used for making the lance type joint 260 illustrated in FIGS. 8–10. Apparatus 650 is made up of a coaxially aligned punch 652 and die 654. Punch 652 has a longitudinally aligned generally rectangular cross-section punch projection 656 which cooperates with a rectangular shaped recess 658 in die 654. Punch projection 656 and die recess 658 are aligned along a common longitudinal joint axis 660 illustrated in FIGS. 75 and 76.

Figure 75:
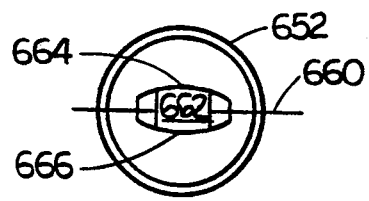
Figure 76:
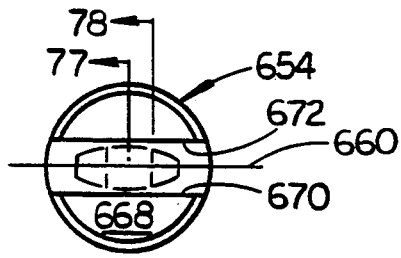

As shown in FIG. 75, the punch 652 is provided with a free end 662 and a pair of arcuate sharp cutting edges 664 and 666 which are convexly oriented relative to longitudinal axis 660. Die 654 is provided with a generally planar die face 668 which lies in a plane perpendicular to the die axis. Die face 668 forms a pair of parallel cutting edges 670 and 672 spaced apart on opposite sides of longitudinal die axis 660. The phantom outline of the punch projection 656 is illustrated with reference to the die recess in FIG. 76 illustrating how the clearance between the punch and the die varies longitudinally. A minimum clearance occurs at the midpoint of the punch projection 656 and at the midpoint of the joint and the die clearance increases gradually moving in either direction from the midpoint.

Figure 77:
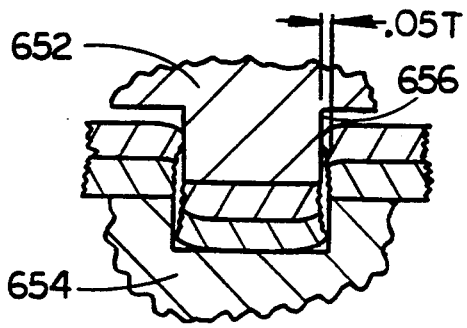
Figure 78:
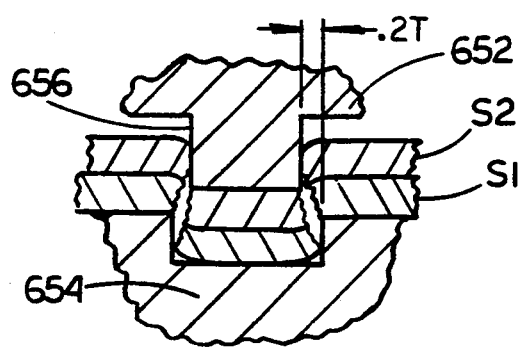
Figure 79:
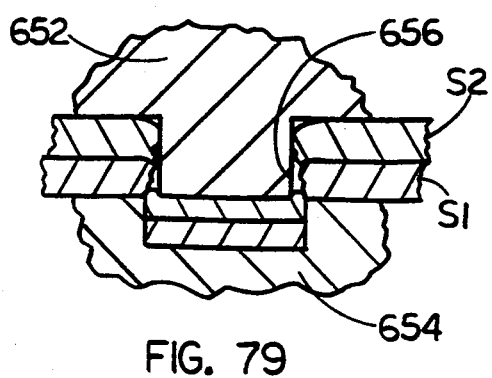
Figure 80:
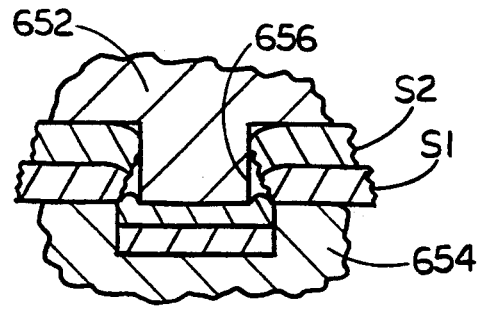
Figure 81:
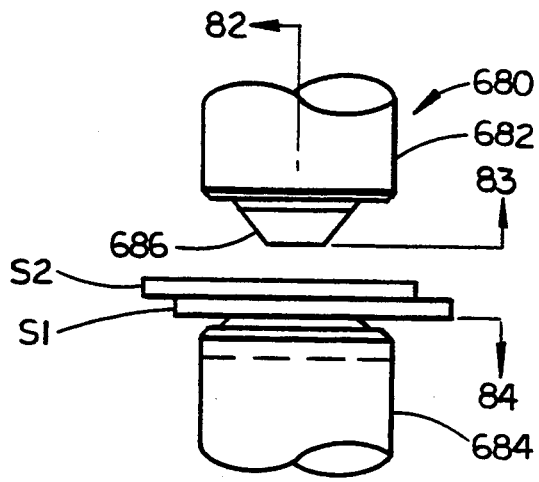
FIGS. 81–88 illustrate a fifth tool embodiment and a sequential series of cross-sectional views showing the formation of the fifth joint embodiment.
Figure 82:
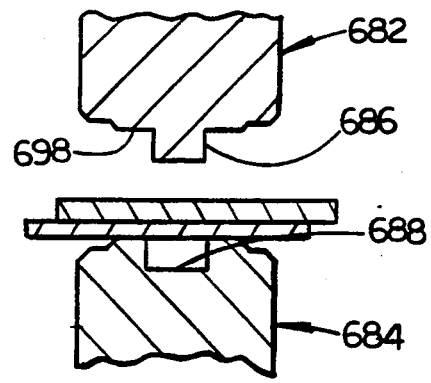
Figure 83:
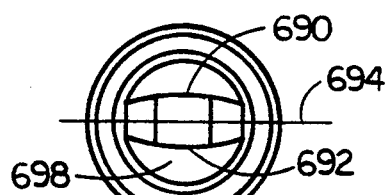
Figure 84:
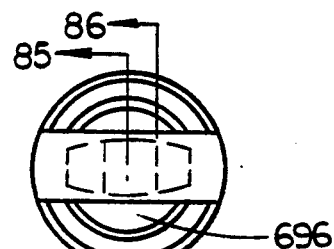

FIGS. 77 and 79 are cross-sectional side elevations taken along the midpoint section line 77 shown in FIG. 76 and various sequential steps in the formation process. FIG. 78 and 80 are comparable cross-sectional side elevations taken along section line 78 illustrating the changing die clearance. In FIG. 77, the midpoint die clearance is preferably 0.05 T, where T again is the thickness of the thicker of the two sheets forming the overlap stack. The pair of lanced non-intersecting slits have been formed and a center spot projected out of the plane of the sheets into the die recess. In FIG. 79, the punch has been axially moved relative to the die causing the center spot to be squeezed between the punch end and the die floor, plastically extruding the material of the spot outward away from the longitudinal joint axis. FIGS. 78 and 80 are two comparable sections to FIGS. 77 and 79 which were taken in the section of the joint where die clearance is maximum. In FIG. 78, die clearance is preferably 0.2 T. Again, FIGS. 77 and 78 are intermediate steps showing the two slits prior to the squeezing of the spot and FIGS. 79 and 80 show the completed joint with the center spot plastically deformed outwardly.

Figure 85:
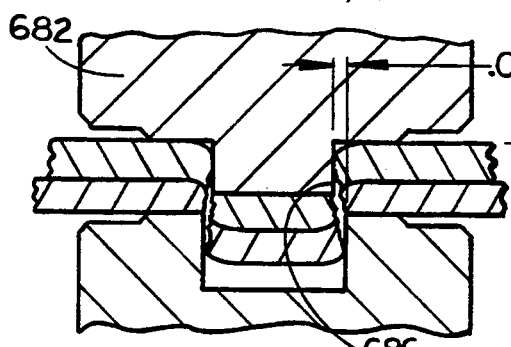
Figure 86:
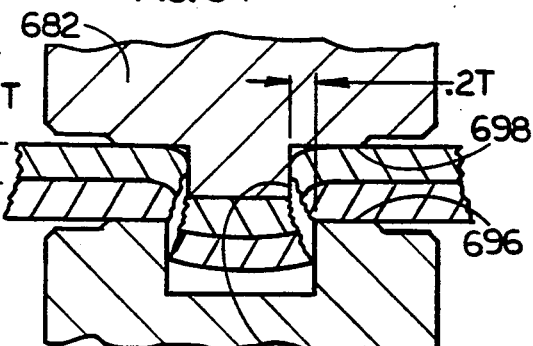

A fifth apparatus is illustrated in FIGS. 81–88 for forming the lance type joint 290, shown in FIGS. 11–13. Apparatus 680 is very similar to the apparatus 650 described previously. Rather than squeezing the spot between the punch end and the die floor, the material forming the sheets immediately outboard of the pair of lanced non-intersecting slits is deformed between the punch and the die, causing the material to extrude radially inwardly into conformity with the punch contour. Apparatus 680 is made up of a punch 682 and a die 684 having a cooperating punch projection 686 and a die recess 688. Like the prior apparatus, punch projection 686 has a pair of convex sharp cutting edges 690 and 692 oriented on opposite sides of joint longitudinal axis 694. Once again, as illustrated in FIGS. 85 and 86, the clearance between the punch and the die is at a minimum in the center of the formed joint, approximately 0.05 T and at a maximum on opposite sides of the joint midpoint adjacent the webs where the clearance is approximately 0.2 T.

Figure 87:
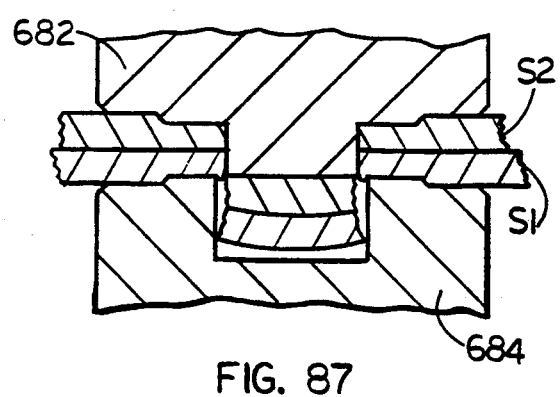
Figure 88:
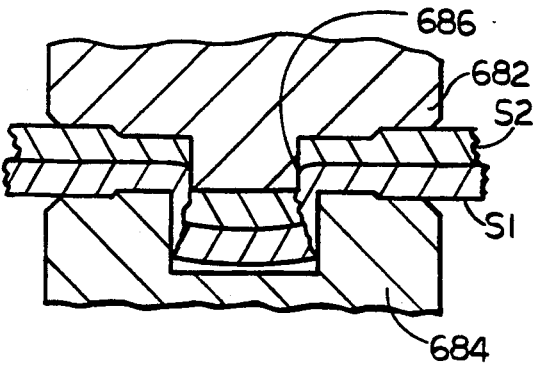

Like the previous apparatus, initially the punch projection lances a pair of non-intersecting slits forming a central spot as illustrated in FIGS. 85 and 86. At that stage, the overlapping sheets engage die face 696 and punch coining face 698. As the punch moves axially into the die further as shown in FIGS. 87 and 88, the region of the sheets immediately outboard the formed slits is deformed, causing the material therein to be plastically deformed inwardly and in conformity with the contour of the punch.

A sixth apparatus embodiment 700 is illustrated in FIGS. 89–96 suitable for fabricating a joint 310 illustrated in FIGS. 14–16. Apparatus 700, as illustrated in FIGS. 89–96, is designed for forming the lance type joint 310 previously illustrated in FIGS. 14–16. Apparatus 700 is made up of a coaxially aligned punch 702 and die 704. Punch 702 is essentially identical to punch 682, as described previously with reference to apparatus 680. Die 704 differs from die 684, as described previously in that die recess 706 is shallower, so that the central spot can be squeezed between punch end 708 and die recess floor 710, previously described with reference to apparatus 620.

The punch 702 is provided with a punch coining face 712 and the die is provided with a die face 714, both of which are aligned generally perpendicular to the common axis of the punch and die assembly. Like the previously described embodiment, punch projection 716 has a pair of convex cutting edges cooperating with a pair of parallel cutting edges on the die in order to cause the clearance between the punch and the die to vary along the longitudinal length of the joint. The die clearance has a minimal value at the center of the joint and the die clearance increases in both directions moving away from the center toward the joint ends. As the punch projection initially lances a pair of non-intersecting slits, the central spot defined therebetween is pushed out of the plane of the sheets S1 and S2, as best illustrated in FIGS. 93 and 94, which are cross-sectional views taken through the midpoint of the joint and at a point outwardly spaced therefrom. As indicated in these Figures, the die clearance is preferably 0.05 T at the joint midpoint and 0.2 T at each of the two maximum clearance regions at opposite sides of the joint.

At the stage of joint formation illustrated in FIGS. 93 and 94, the sheets are not yet squeezed and maintain their initial thickness T. As the punch axially continues to advance relative to the die to its final maximum travel position, as illustrated in FIGS. 95 and 96 (which correspond respectively with FIGS. 93 and 94), the central spot of the joint is axially compressed between the punch end 708 and the die floor 710, causing the material to radially extrude outwardly in conformity with the walls of die recess 706. Simultaneously, the material forming the overlapped sheets immediately outboard of the slits is squeezed between punch coining face 712 and die face 714 to inwardly extrude material therebetween into conformity with the outer periphery of punch projection 716 to form a securely interlocked joint.

The variable shear clearance features of apparatuses 650, 680 and 700 facilitate the formation of high quality joints of consistent strength in spite of variations in sheet metal thickness. The minimum die clearance of 0.05 T will initiate a shear consistently, even if the sheet metal thickness is a little greater than or less than expected. The maximum die clearance of 0.2 T results in plenty of interference to create a secure joint and facilitate the propagation of the slit once initiated in the center of the joint into the high clearance region.

Apparatus and Method of Forming a Variable Clearance Leak Proof Joint

Figure 97:
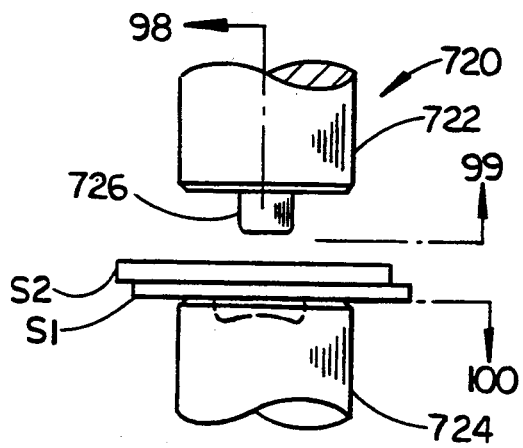
FIGS. 97–104 illustrate a seventh tool embodiment and a sequential series of cross-sectional views showing the formation of the seventh joint embodiment.
Figure 98:
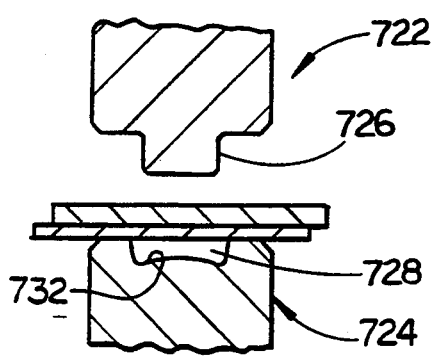
Figure 99:
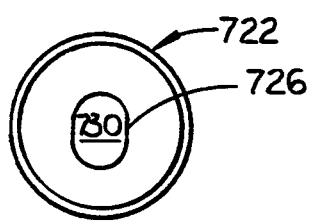
Figure 113:
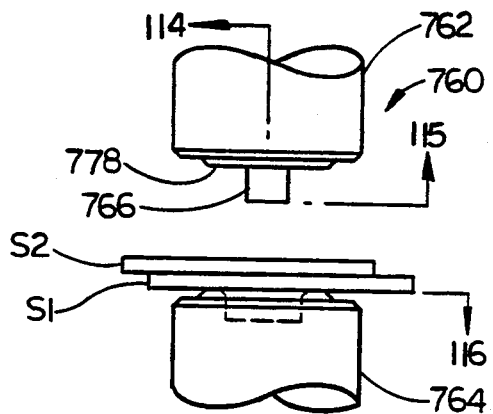
FIGS. 113–120 illustrate a ninth tool embodiment and a sequential series of cross-sectional views showing the formation of the ninth joint embodiment.
Figure 114:
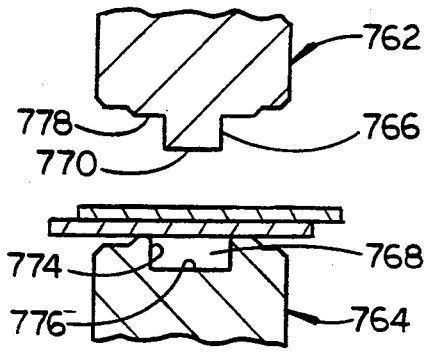

Apparatus 720 of FIG. 97, apparatus 740 of FIG. 105 and apparatus 760 of FIG. 113, illustrate an apparatus for forming the leak proof joints 330, 350 and 370, respectively shown in FIGS. 17, 20 and 23. Each of these apparatuses are provided with a coaxially aligned punch and die, the punch having a punch projection which is generally cartouche in shape and the die having a circular cylindrical recess formed therein sized to cooperate with the punch projection to form a clinch joint having a pair of nested cups in a plurality of overlapped sheets of deformable material. The punch projection and the die recess have variable radial clearance therebetween, in order to define a series of minimum clearance regions, and a plurality of alternately maximum clearance regions. The three different apparatuses illustrated in FIGS. 97, 105 and 113 differ in the manner in which they squeeze the overlapping sheets together to securely interlock the nested cups.

Figure 100:
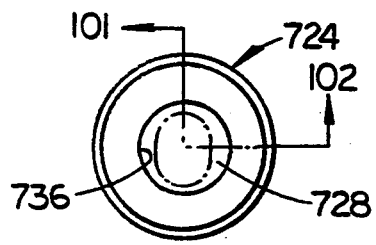
Figure 101:
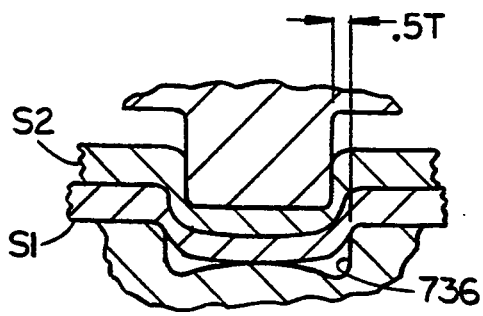
Figure 102:
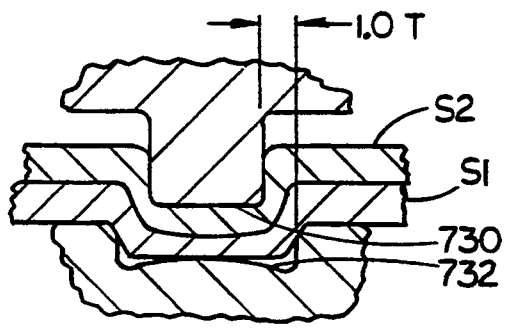

The apparatus 720 as illustrated in FIGS. 97 through 104 define a formation of a leak proof joint 330 previously described with reference to FIGS. 17–19. The apparatus 720 includes a punch 722 and a die 724 having a cooperating punch projection 726 and a die cavity 728. Punch projection 726 is generally oval shaped as illustrated in the FIG. 99 end view and has a generally flat die punch end 730 which forms a slightly rounded corner at the intersection of the punch free end and the punch projection walls so as to minimize the likelihood of tearing, while the die cavity 728 is generally circular in shape as illustrated in FIG. 100, providing a variable radial die clearance. Section line 101 is taken through the region of the punch and die assembly in which clearance is a minimum. Section line 102 is taken through the punch and die assembly where the die clearance reaches its maximum value. FIGS. 101 and 102 correspond to section lines 101 and 102 in FIG. 100 showing a joint in an intermediate stage of formation. As illustrated in these Figures, the minimum radial die clearance is 0.5 T where T is the average thickness overlapping sheets. It should be appreciated, however, when three or more sheets are used, T should be calculated as one half of the total thickness. At the maximum clearance region, die clearance increases to 1.0 T resulting in a relatively thicker cup hole section. Cup wall thickness gradually varies around the cup periphery between the minimum and maximum regions. As punch 722 continues to move axially relative to the die, the material in the cups is plastically deformed which causes the cups to interlock. It should be appreciated that in these, as well as all of the other Figures, the components are not drawn to scale, but rather exaggerated slightly in order to better illustrate how the overlapping sheets interlock together.

Figure 103:
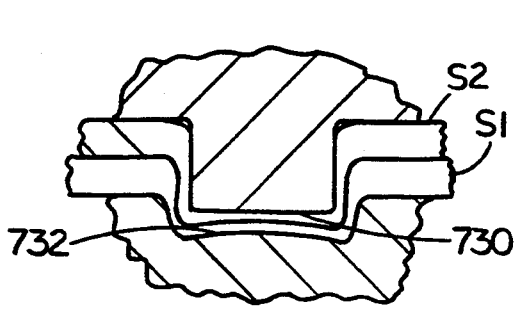
Figure 104:
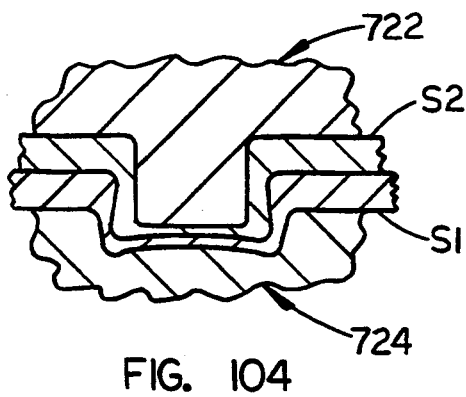

In FIGS. 103 and 104, the fully formed joint is illustrated. The bottom of the nested cups has been squeezed between punch end 730 and die cavity floor 732, causing the material squeezed therebetween to be plastically deformed and extruded radially outward into conformity with the generally vertical peripheral wall 736 of die cavity 728. It should be appreciated that use of a slight draft in the wall 736 will aid in the removal of the joint from the die. This plastic deformation results in the nested cups deforming sufficiently to create a secure joint. The minimum clearance regions insure that there will always be ample interference to insure the cups will not become unnested, while the maximum wall thickness regions insure that there is always ample wall material to prevent the cups from prematurely failing when loaded in shear.

Apparatus 740, shown in FIGS. 105–112, is used for the formation of joint 350, as previously shown in FIGS. 20–22. The apparatus 740 functions similar to apparatus 720 previously described as an apparatus squeezing the bottom of the coaxially nested cups between the punch end and the die floor, except that the outer peripheral region of the sheets surrounding the cups is squeezed in order to interlock the walls of the nested cups.

Apparatus 740 is made up of a punch 742 and a die 744 having respectively formed thereon a projection 746 and a die recess 748. Punch projection 746 is a generally oval shaped cylinder as illustrated in FIG. 107 and is sized to fit within a generally circular cylindrical die cavity 748. Punch projection 746 has a generally flat die punch end 750 which forms a slightly rounded corner at the intersection of the punch free end and the cylindrical punch projection wall in order to minimize the likelihood of tearing. Die 744 is provided with a generally flat die face 752 which lies in a plane perpendicular to the die axis. Die face 752 extends circumferentially around the die recess 748 and has a rounded corner at the intersection of the die face and the cylindrical wall 754 of the die recess. Punch 742 is further provided with a generally planar punch coining face 756 and a recessed groove 758 extending about the punch projection between the punch projection and the punch coining face 756.

As previously described with reference to apparatus 700 and 720, the radially varying die clearance between the punch projection and the die cavity varies about the axis of the punch and die assembly between a minimum value of 0.05 T to a maximum value of approximately 1.0 T where T is the average material thickness in a two-sheet joint. FIGS. 109–110 illustrate the joint in an initial stage of formation where a pair of nested cups have been initially formed between the punch projection and the die cavity. FIGS. 109 and 110 illustrate the minimum and maximum die clearance cross sections, respectively. The fully formed joint, is illustrated in FIGS. 111 and 112, which also show the minimum and maximum die clearance cross sections, respectively.

In FIGS. 111 and 112, the punch is moved to its fully advanced position relative to the die, squeezing the material of the overlapping sheets immediately outboard of the nested cups to cause the material to radially extrude inwardly into conformity with the punch projection. One should note that the material in the upper sheet S2 has been extruded into groove 758 enabling better inward radial penetration of material in the lower sheet S1, thereby enhancing the mechanical interlock between the nested cups. Preferably, groove 758 has a width of approximately 0.5 T.

The apparatus 760 illustrated in FIGS. 113–120 is used to form the joint 370 previously shown in FIGS. 23–25. Apparatus 760 is similar to apparatus 720 and 740, previously described, however, both the center portion of the nested cups of joint 370 as well as the sheets extending about the outer periphery of the nested cups are simultaneously squeezed between the punch and the die in order to interlock the cup walls.

Figure 115:
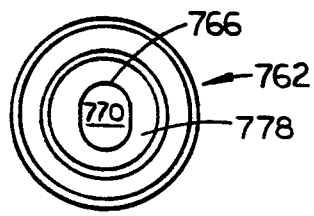
Figure 116:
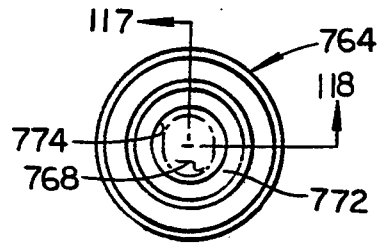

Apparatus 760 is made up of a coaxially aligned punch 762 and die 764, respectively having a punch projection 766 and a die recess 768 formed therein. Punch projection 766 is generally cylindrical shaped having an oval cross-section and punch free end 770, as best shown in FIG. 115. The punch end 770 intersects the cylindrical wall of the punch and forms a slightly rounded corner in order to prevent the material of the sheets from tearing.

Die 764 is provided with a generally flat die face 772 lying in a plane generally perpendicular to the die axis. The die face 772 intersects the generally cylindrical die recess 768 at a rounded corner. Die recess 768 provides a generally cylindrical outer wall 774 and a generally flat die cavity floor 776. Punch 762 is further provided with a generally flat punch coining face 778 which lies in a plane perpendicular to the punch axis. Punch coining face 778 stands about the periphery of the punch projection 766.

Figure 117:
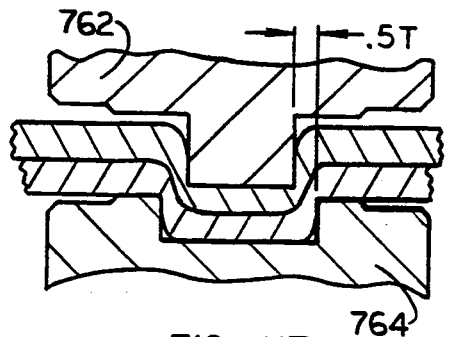
Figure 118:
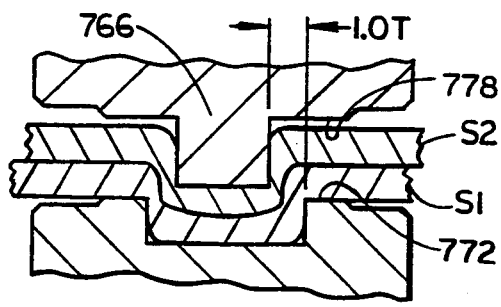
Figure 119:
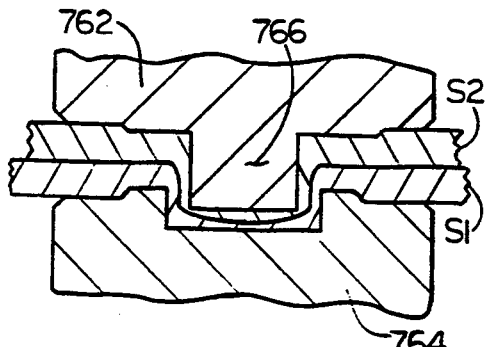
Figure 120:
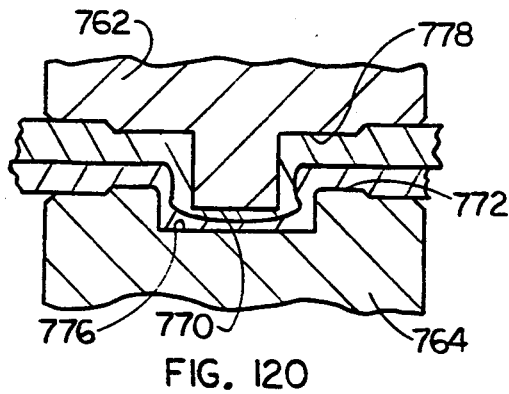
Figure 137:
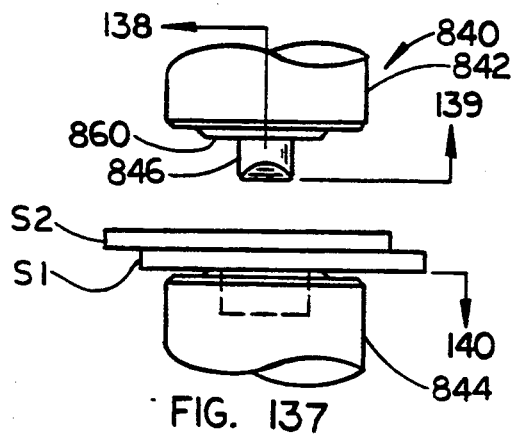
FIGS. 137–144 illustrate a twelfth tool embodiment and a sequential series of cross-sectional views showing the formation of the twelfth joint embodiment.
Figure 138:
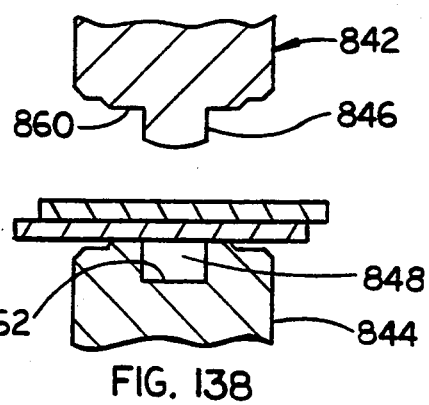
Figure 139:
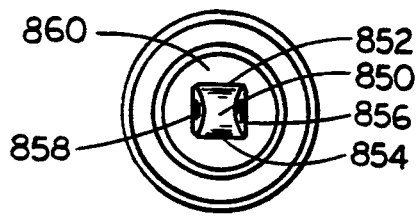

FIGS. 117 and 119 are sections through the punch and die assembly where die clearance is at a minimum showing the punch and die assembly at an intermediate and maximum travel position, respectively. FIGS. 118 and 120 are sections through the punch and die assembly where die clearance is maximum showing the punch and die assembly at an intermediate and maximum travel position. At the intermediate position in FIGS. 117 and 118, the two nested cups are shown drawn between the punch and the die. As the punch continues to axially advance to the fully advanced position shown in FIGS. 119 and 120, the material between the punch end 770 and the die floor 776 is squeezed together plastically extruding the material radially outward. Simultaneously, the material between the punch coining face 778 and the die face 772 is squeezed together causing the material to plastically extrude radially inwardly into conformity with the outer periphery of the punch projection 776.

As a result of this plastic deformation, the walls of the nested cups become securely mechanically interlocked as illustrated. As previously described, the minimum clearance region provides a secure interlock and adequate peel strength even when sheet metal thickness varies somewhat thinner than anticipated. The maximum clearance regions result in thick cup walls which produce a joint having very good shear strength.

Apparatus and Method for Forming Lanced Joints with Interlocked Webs

The remaining FIGS. 121–168 illustrate six different apparatus embodiments, 780, 810, 840, 870, 900 and 950, which are respectively used to form joints 390, 420, 450, 470, 500 and 520. The common feature with all of these joints is that they are the lance type in which a pair of non-intersecting slits are formed from a plurality of overlapping sheets of deformable material to define a center spot which is deformed out of the plane of the sheets. The central spot is connected to the remainder of the sheets by a plurality of webs which are alternatively spaced between adjacent slit ends. Webs formed by the present apparatus are generally vertical and are deformed to interlock with one another to increase the joint strength and particularly, the strength of the joint in shear when loaded along a joint longitudinal axis. Apparatus 780, 810 and 840 are three variations of an apparatus fort forming a generally rectangular lance joint having a pair of parallel slits and a pair of parallel webs. Apparatus 870, 900 and 950 are used to form a generally oval lance joint having a pair of arcuate slits and a pair of spaced apart intermediately spaced vertical webs.

Apparatus 780, illustrated in FIGS. 121–128, is made up of a coaxially aligned punch 782 and die 784 having formed thereon a punch projection 786 and a die recess 788, respectively. Punch projection 786 has a punch end 790 having two sharp cutting edges, 792 and 794, and two rounded corners, 796 and 798, formed adjacent the junction between the punch end and the generally square wall of the punch projection. The punch projection cooperates with die recess 788, which is generally rectangular in shape, as illustrated in FIG. 124. The die recess 788 is provided with a generally flat floor 800 and a pair of generally vertical side walls which intersect die face 802 to form a pair of spaced apart generally parallel cutting edges 804 and 806. Die recess 788 also has a pair of generally vertical end walls which intersect die face 802 and provide a generally rounded corners 808 and 809.

The punch and die are aligned along a longitudinal axis parallel to section line 126 shown in FIG. 124. In order to form a lanced type joint with a pair of sheared non-intersecting slits formed between the cooperating sharp cutting edges, the punch and the die form a pair of webs between the radiused corners on the opposite faces of the punch and the die. FIGS. 125 and 127 are transverse cross-sectional side views through the punch and die assembly along section line 125 showing the joint in the intermediate stage of fabrication and the complete stage of fabrication, respectively. FIG. 126 and 128 show the joint along section line 126 at an intermediate stage of fabrication and a complete stage of fabrication, respectively. When referring to FIG. 125, punch projection 786 is shown partially penetrating the overlapping sheets, shearing a pair of slits between sharp corner 792 and 794 on the punch projection 786 and a pair of cooperating sharp corners 804 and 806 of die 784. The longitudinal clearance between the cutting edges should be greater than 0.08 T. Most preferably, the clearance is approximately 0.1 T where T is the thickness of the thicker of the two sheets. As the punch continues to move axially toward the die to the full travel position shown in FIG. 127, the material between the punch end 790 and the die floor 800 is squeezed plastically, extruding the material therebetween longitudinally outward as well as transversely outward into conformity with the walls of the die recess.

FIG. 126 is a longitudinal cross-section showing the punch initially penetrating the two overlapped sheets, S1 and S2. In this section, the clearance between the punch and the die is greater in order to draw a pair of webs without fear of shearing. Preferably, the clearance is 0.75 T' where T' equals the average thickness of the sheets in the event that there are more than two sheets. Preferably, the punch will have a pair of rounded corners 796 and 798 and the die will have a pair of rounded corners, 808 and 809, so that the webs can be formed without tearing the sheet metal and without making an unnecessary stress concentration on the formed joint. FIG. 128 shows a punch and die axially moved together to the fully advanced position where the joint has been completely formed. As the material between the punch and the die floor is squeezed, it moves longitudinally outward forming a pair of generally vertical webs as described previously with respect to joint 390. The individual layers of the web made up of the individual sheets of overlapping material forming the joint are securely, mechanically interlocked together as illustrated in FIG. 128, providing a secure joint, which will exhibit very good load characteristics.

Apparatus 810, illustrated in FIGS. 129–136, is used to manufacture the joint 420 previously illustrated in FIGS. 29–31. Apparatus 810 is made up of a punch 812 and a die 814 provided with punch projection 816 and a die recess 818 which are sized to cooperate with one another. The punch and die of apparatus 810 are very similar to the punch and die of apparatus 780 described previously, however, rather than squeezing the center spot of the joint between the punch free end 822 and the die, punch 812 is provided with a coining face 817 for cooperation with a die face 820 to squeeze the material forming the sheets axially together causing the material to radially extrude inwardly into conformity with the punch projection.

As described previously with reference to apparatus 780, punch projection 816 is provided with a generally rectangular punch end 822 having two sides forming sharp cutting edges, 824 and 826, and two sides forming rounded corners 828 and 830. The rectangular punch cavity 818 is similarly provided with a pair of relatively sharp cutting corners 832 and 834 and a pair of radiused edges 836 and 838. Cutting edges 832 and 834 respectively cooperate with cutting edges 824 and 826 on the punch projection in order to lance a pair of non-intersecting generally parallel spaced apart slits in the overlapping sheets of metal, S1 and S2.

FIG. 133 is a transverse cross-sectional view showing the punch in an intermediate stage of its travel having penetrated the sheets to form a pair of non-intersecting slits. Slits are formed between the sharp corners of the punch and die respectively to cause the sheets to tear diagonally therebetween. The clearance between the punch and the die should be in excess of 0.08 T where T is the thickness of thicker of the two sheets. FIG. 134 is a longitudinal cross-sectional view taken along section line 134 showing the joint at an intermediate stage of its formation. The die clearance along a longitudinal direction between the punch projection and the die is preferably 0.75 T' where T' is the average thickness of the sheets in the case of a two sheet joint and one half of the total thickness in the case where more than two sheets are used. The die clearance of 0.75 T' assures that the webs are strong and do not tear, although formed substantially vertical and securely interlock once the joint is fully formed. FIGS. 135 and 136 correspond to FIGS. 133 and 134, respectively, with the punch moved to its full travel position. Again, in the present embodiment, the center spot is not squeezed between the punch and the die, but rather the material immediately transversely outboard of the slits is squeezed between the punch coining face 817 and die face 820, causing the material to radially extrude inward both longitudinally and transversely in order to conform to the shape of the punch projection. It should be appreciated that this is especially true when sheet S2 is thinner or softer than sheet S1.

Apparatus 840, illustrated in FIGS. 137-144, is used to form the joint 450 previously described and shown in FIGS. 32-34. Apparatus 840 is very similar to apparatus 780 and apparatus 810, described previously, however both the central spot, as well as the region immediately surrounding the central spot are simultaneously squeezed to cause the material of the sheets to securely interlock. Apparatus 840 is made up of a punch 842 and a die 844 having a punch projection 846 and a die recess 848, respectively formed therein. Punch 842 and die 844 are coaxially aligned with one another along a common axis, with formation of the lanced joint between overlapped sheets of deformable material S1 and S2. As previously described with reference to embodiments 780 and 810, punch projection 846 is provided with a generally square punch free end 850 having sharp cutting edges, 852 and 854, and a pair of edges having rounded corners, 856 and 858. Extending about the punch projection and lying in a plane perpendicular to the punch axis is a punch coining face 860.

Die recess 848 is part of the die 844 and has a generally flat die floor 862 and rectangular side walls which intersect die face 864 to form a pair of sharp corners 865 and 866 and a pair of radiused corners, 867 and 868.

Figure 140:
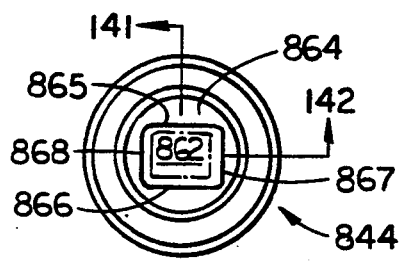
Figure 141:
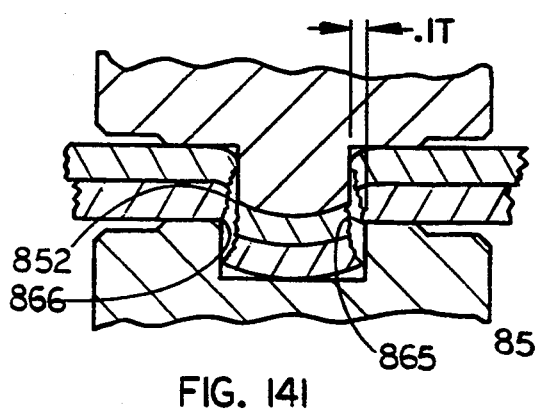
Figure 143:
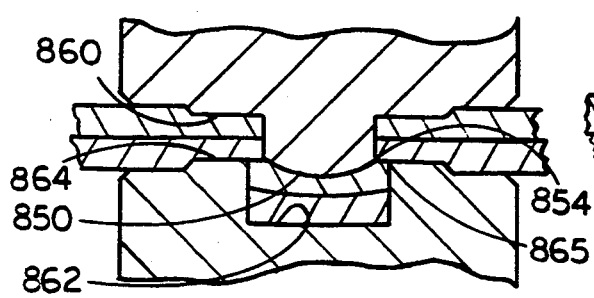
Figure 144:
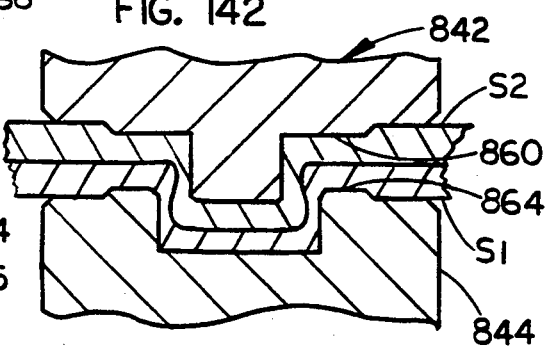

As previously described with reference to apparatus 780 and 810, the die shear clearance between the corresponding sharp corners on the punch projection and the die is in excess of 0.08 T and preferably 0.1 T. The die clearance in the longitudinal direction is preferably 0.75 T, in order to insure the formation of strong, generally vertical interlocked webs. FIGS. 141 and 143 illustrate transverse cross-sections taken along section line 141 in FIG. 140, showing the joint in the intermediate and final stage of formation, respectively. In FIG. 141, the two non-intersecting slits have been lanced diagonally between the sharp corners of the punch and die. In FIG. 143, the die has progressed axially to squeeze both the center spot of the joint between the punch and the die floor, and to simultaneously squeeze the region of the sheets transversely outboard the sheets between the punch coining face 860 and the die face 864 in order to inwardly extrude the material into conformity with the punch and projection.

Figure 142:
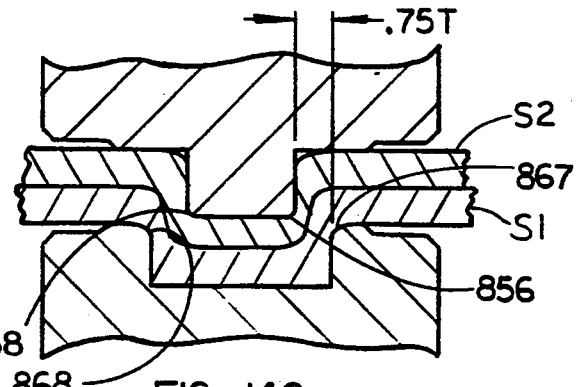

FIG. 142 is a transverse cross-sectional view taken along line 142 shown in FIG. 140 illustrating the joint in an intermediate stage of fabrication. As the punch continues to progress inwardly toward the die to the final position shown in FIG. 144, the center spot is squeezed between the punch end and the die floor and the region of the sheets outboard of the webs is squeezed together causing the webs to securely interlock as illustrated.

Figure 145:
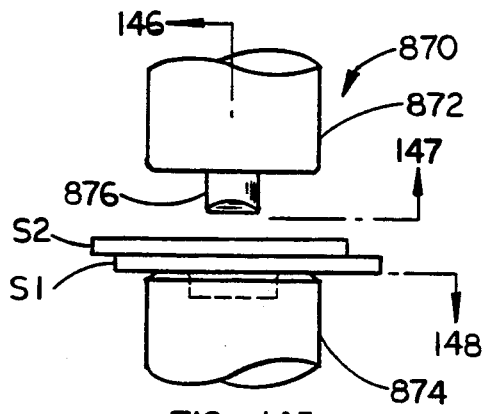
FIGS. 145–152 illustrate a thirteenth tool embodiment and a sequential series of cross-sectional views showing the formation of the thirteenth joint embodiment.
Figure 146:
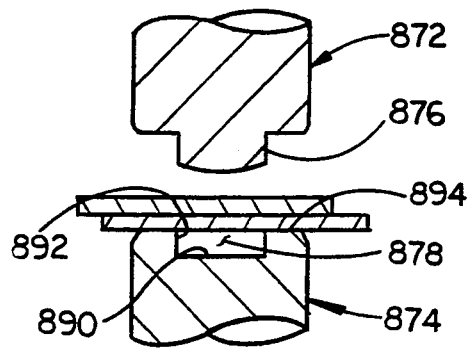
Figure 147:
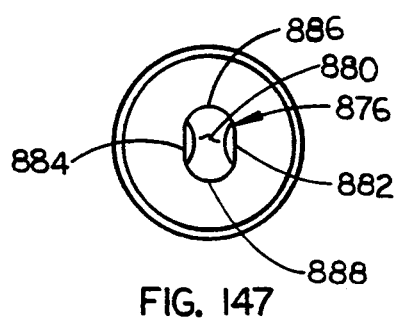
Figure 153:
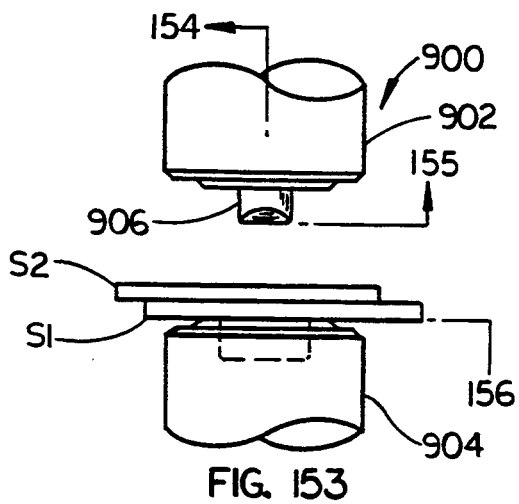
FIGS. 153–160 illustrate a fourteenth tool embodiment and a sequential series of cross-sectional views showing the formation of the fourteenth joint embodiment.
Figure 154:
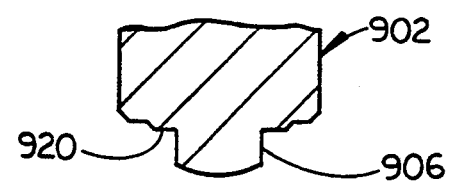
Figure 155:
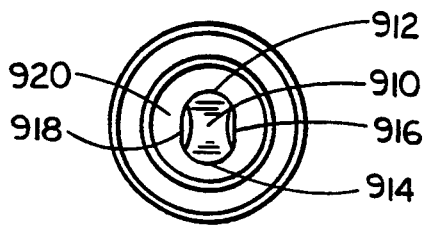
Figure 156:
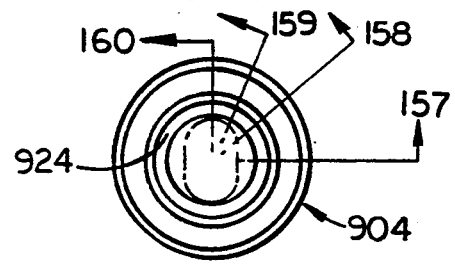
Figure 161:
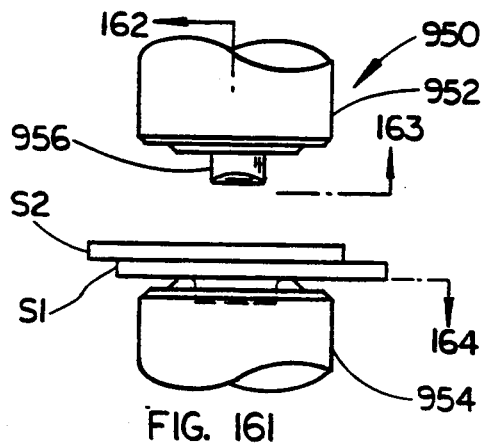
FIGS. 161–168 illustrate a fifteenth tool embodiment and a sequential series of cross-sectional views showing the formation of the fifteenth joint embodiment.
Figure 162:
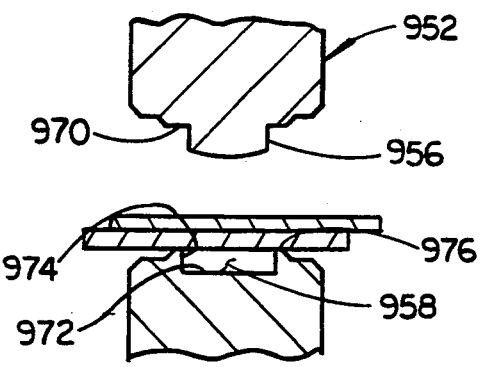
Figure 163:
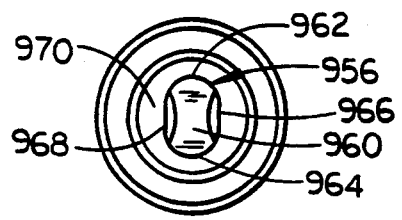

Apparatus 870, 900 and 950, illustrated in FIGS. 145, 153 and 161, respectively, illustrate apparatus for forming oval lanced type joints 470, 500 and 520, previously described with reference to FIG. 35, 40 and 45. These joints, while generally similar in shape, differ in the manner in which the joints are squeezed together in order to securely interlock the lanced central spots.

Apparatus 870 is provided with a coaxially aligned punch 872 and die 874 provided with a punch projection 876 and a die recess 878, respectively. The punch and die are coaxially aligned relative to one another to simultaneously form a lanced-type clinch joint in a plurality of overlapped sheets, S1 and S2. Punch projection 876 is provided with a slightly crowned free end 880 which is provided with a pair of straight sides having radiused corners 882 and 884 and a pair of semi-circular ends having sharp corners 886 and 888.

Die 874 is provided with a central cavity 878, which is generally circular in shape, having a die floor 890 and a generally vertical circumferential cavity wall which intersects the generally planar die face 894 to form a very small radius therewith. This enables the die to be placed at any angle or orientation. The die cavity is sized to receive the punch projection coaxially therein to create a variable radial die clearance which has two minimum clearance sections and two maximum clearance sections which are spaced from one another.

The small radius at the intersection of the cavity wall in the die face should be selected such that it is round enough to prevent tearing when the webs are drawn in the two maximum clearance sections, yet sharp enough to shear in the minimum clearance sections. Preferably as shown, the die is in the position that a fixed annular orientation relative to the punch is used where a larger radius can be utilized in the regions in which the web is formed and a sharp corner is utilized in a region in which the slits are formed. Preferably, apparatus 870, 900 and 950 can utilize dies of either design.

Figure 148:
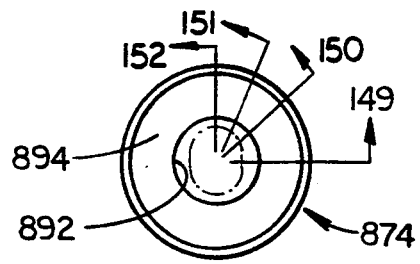
Figure 149:
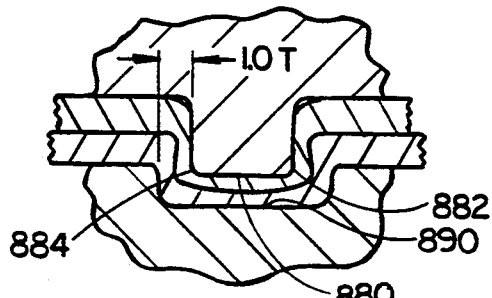
Figure 150:
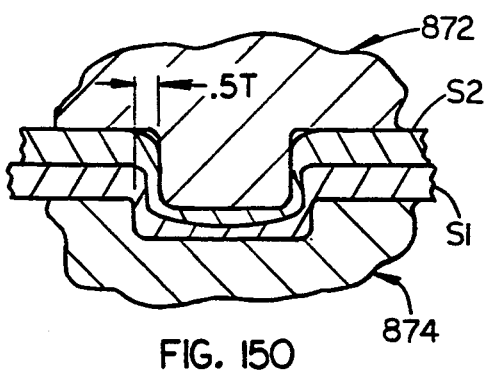
Figure 151:
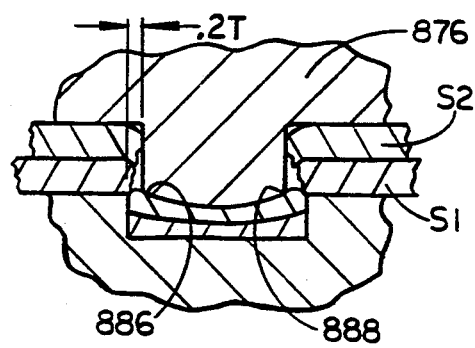
Figure 152:
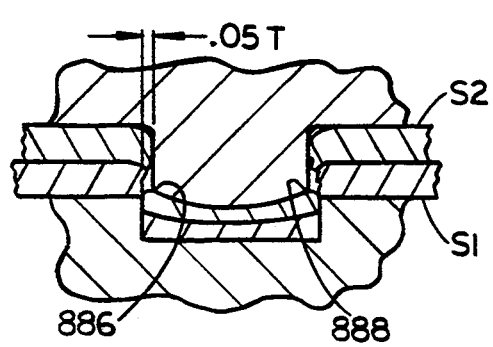

FIG. 149 is a longitudinal cross-sectional view taken along section line 149 in FIG. 148, illustrating the maximum radial clearance between the punch projection and the die cavity which is preferably 1.0 T where T is the average thickness of the two sheets at section 149 illustrated in FIG. 149. The radial clearance is decreased to 0.5 T causing the generally vertical web to be much thinner at section 150. At sections 151 and 152, the die clearance has decreased to 0.2 T and 0.05 T, respectively, causing a slit to be sheared between the punch and the die. As illustrated, the punch and the die are at their maximum travel relative to one another causing the center spot of the joint to be squeezed between the punch end 880 and the die floor, 890, causing the material therein to extrude longitudinally as well as transversely outwardly interlocking the generally vertical web ends and causing the center spot to become larger than the cavity which has been lanced through sheets S1 and S2.

As previously described, one should keep in mind that the optimum clearance for shearing tends to be the function of the clearance of the thickest sheet in the stack while the optimum clearance for drawing tends to be a function of the total stack thickness. It should be appreciated that although two sheets of equal thickness are used for purposes of illustration, appropriate shear clearance and drawing clearance need to be selected, for a particular application, if more than two sheets or dissimilar sheet thicknesses are used.

Apparatus 900 is designed to form the lance type joint 500 shown in FIG. 40. Apparatus 900 is made up of a coaxially aligned punch and die 902 and 904 having punch projection 906 and a die cavity 908 formed therein. As previously described, punch projection 906 is generally oval in shape having a slightly crowned face 910, a pair of sharp semi-circular corners 912 and 914, and a pair of generally planar radiused edges 916 and 918. Surrounding punch projection 906 is a punch coining face 920 which lies in a plane generally perpendicular to the punch axis. Die 904 has a generally circular cylindrical recess cavity 908 formed therein having a cylindrical wall portion 922 which generally perpendicularly intersects planar die face 924 forming a very small radius at the intersection thereof.

Figure 157:
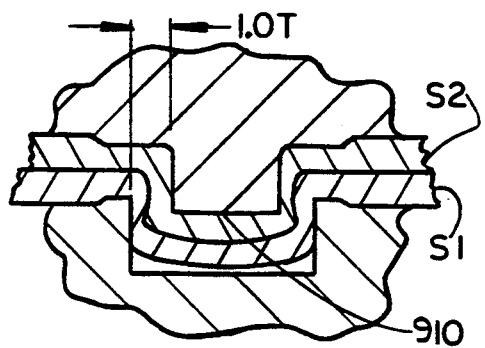
Figure 158:
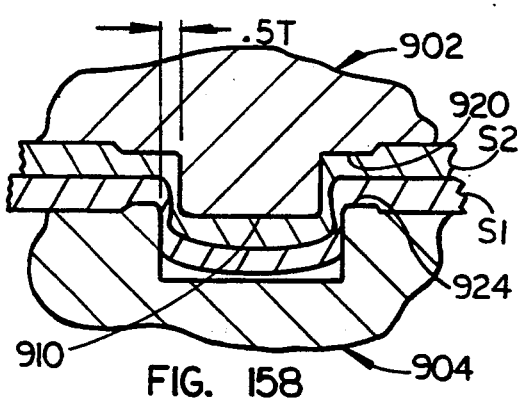
Figure 159:
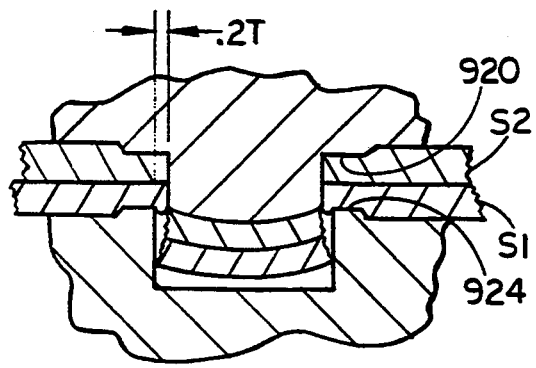
Figure 160:
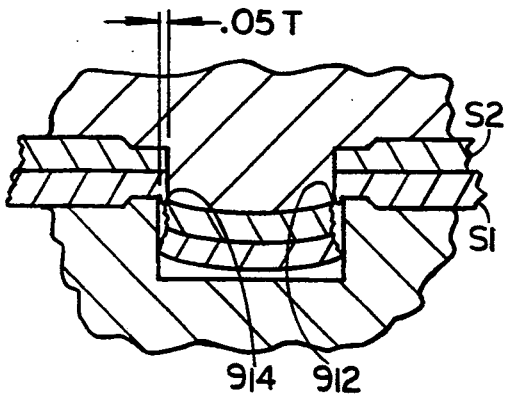

As previously described with reference to apparatus 870, the radial clearance between punch projection 906 and the die cavity 908 varies about the periphery of the joint in order to form two lanced slits where die clearance is low and two generally vertical web sections where die clearance is great. At section 157 in FIG. 156, die clearance is at its maximum radial dimension, i.e. approximately 1.0 T. Moving about the periphery of the die at section 158, the radial clearance is decreased to 0.5 T resulting in a relatively thin web section. At section 159, radial clearance is decreased to 0.2 T sufficient to shear two non-intersecting slits between the sharp corners of the punch 902 and 904 in the corresponding corners of the die. FIG. 160 illustrates a transverse section through the punch and die and assembly at the minimum clearance of 0.05 T. In FIGS. 157–160, the punch is shown fully advanced relative to the die causing the joint to be completely formed. In apparatus 900, the center spot of the joint is not squeezed, rather the material about the spot periphery between punch coining face 920 and die face 924 is squeezed causing the material to inwardly extrude into conformity with the outer periphery of the punch projection. As illustrated in FIG. 157, the webs of the joint are generally vertical and the two layers of the webs are securely interlocked. Shown in FIG. 160, the center spot is larger than the associated recess to securely hold the joint together.

Apparatus 950, illustrated in FIGS. 161–168 is used to form joint 520 shown in FIG. 45. Apparatus 950 is made up of the coaxially aligned punch and die 952 and 954, having a punch projection 956 and a die recess 958 formed therein, respectively. The apparatus 950 squeezes both the central spot of the joint as well as the outer periphery of the sheets surrounding the central spot to secure the joint together, but otherwise, the apparatus works very similar to apparatus 870 and 900 previously described. Punch projection 956 has a slightly round punch end 960 having a pair of semicircular sharp cutting edges 962 and 964 formed at the transverse edges of the punch end. At the longitudinally spaced generally straight edges of the punch face, a pair of rounded corners, 966 and 968, are formed. Circumaxially surrounding the punch is a punch coining face 970 which lies in a plane generally perpendicular to the punch axis.

Die 954 is provided with a generally cylindrical die cavity 958 having a flat bottom 972 and a generally vertical circumferential wall 974 extending between die bottom 972 and a generally planar die face 976 which is perpendicular to the die axis.

Figure 164:
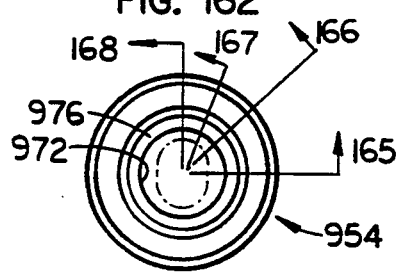
Figure 165:
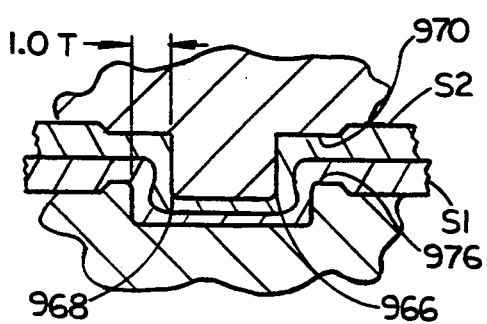

FIGS. 165–168 are a series of cross-sectional views taken along section lines 165 through 168 shown in FIG. 164. FIG. 165 is a longitudinal cross-section showing the two generally vertical joint webs. Joint webs have a thickness of 1.0 T defined by the radial clearance between the punch projection and the die recess as illustrated, the center spot of the joint is squeezed between the punch projection and the die floor and the outboard region of the sheets immediately surrounding the joint is squeezed between the punch coining face 970 and the die face 976 to cause the material therebetween to be squeezed longitudinally inward causing the web sections to mechanically lock as illustrated.

Figure 166:
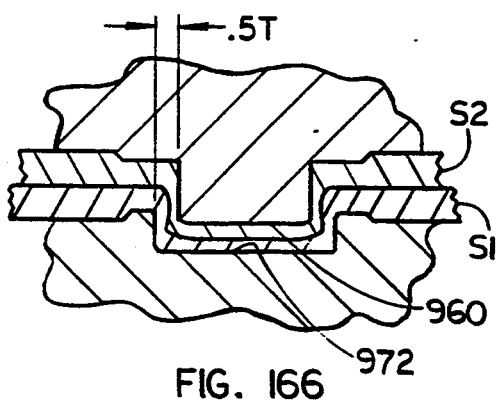
Figure 167:
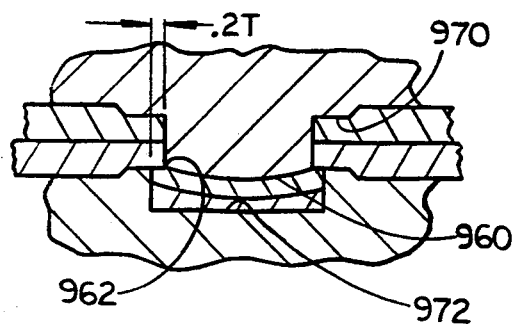
Figure 168:
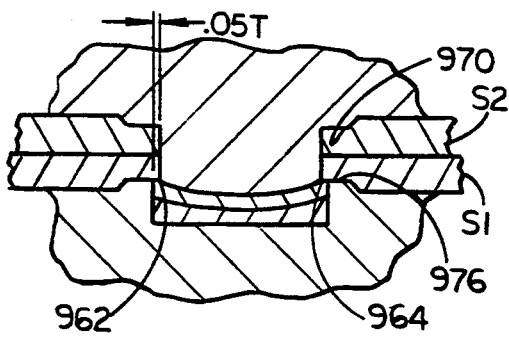

FIG. 166 differs from FIG. 165 only in the radial clearance between the punch and the die. In FIG. 166, the die clearance is approximately 0.5 T resulting in a relatively thin, but continuous, generally vertical web section. In sections 167 and 168, the radial clearance between the punch and the die coupled with the sharp corner on the punch has caused the material of the sheets to shear. The radial clearance at sections 167 and 168 are 0.2 T and 0.05 T, respectively. The two sheets are securely interlocked as a result of the squeezing of the central spot between the punch end and the die floor in conjunction with the simultaneously squeezing of the material immediately transversely outboard of the slits between die face 976 and punch coining face 970.

While the best modes for carrying out the invention have been described in detail, those familiar with the art to which the invention relates will recognize various alternative designs and embodiments for practicing the invention as defined by the following claims.

What is claimed:

1. A method of forming a lance-type clinch joint for fastening a plurality of sheets of deformable material together, comprising:
    overlapping the sheets to be fastened together in a generally parallel relationship to form an overlap region having a first and second side, one sheet of the plurality of sheets being thicker than the other of the plurality of sheets;
    positioning the first side of the overlap region adjacent a die assembly having a central axis, a die face normal to the axis and a die recess having a floor and a plurality of generally vertical walls extending between the floor and the die face forming a plurality of sharp cutting edges at the intersection of the die face and the walls, said walls being spaced apart and securely connected so as to prevent relative movement therebetween;
    positioning a punch having a punch end sized to fit within the die recess adjacent the second side of the overlap region aligned coaxially with the die recess, said punch having a plurality of cutting edges formed on the punch end for cooperating with the die cutting edges and spaced therefrom by a clearance distance C which exceeds 0.08 times the thickness of the thickest of the plurality of sheets; and advancing the punch axially relative to the die thereby cutting a plurality of non-intersecting slits in the sheets which define a central spot connected to the remainder of the sheets by a plurality of webs and subsequently drawing the central spot into the die recess and squeezing the central spot between the die floor and the punch end thereby outwardly extruding the material therebetween into conformity with the vertical walls of the die recess.

2. A method of forming a lance-type clinch joint fastening a plurality of sheets of deformable material together, comprising:

overlapping the sheets to be fastened together in a generally parallel relationship to form an overlap region having a first side and a second side, one sheet of the plurality of sheets being thicker than the other of the plurality of sheets;

positioning the first side of the overlap region adjacent a die assembly having a central axis, a die face normal to the axis and a die recess having a plurality of generally vertical walls forming a plurality of sharp cutting edges at the intersection of the die face and the walls, said walls being spaced apart and securely connected so as to prevent relative movement therebetween;

positioning a punch having a punch end sized to fit within the die recess adjacent the second side of the overlap region aligned coaxially with the die recess, said punch having a coining face overlying the die face and a plurality of cutting edges formed on the punch end for cooperating with the die cutting edges and spaced therefrom by a clearance distance C which exceeds 0.08 times the thickness of the thickest of the plurality of sheets; and advancing the punch axially relative to the die thereby cutting a plurality of non-intersecting slits in the sheets which define a central spot connected to remainder of the sheets by a plurality of webs and subsequently drawing the central spot into the die recess and squeezing the material between the coining face and the die face to thereby inwardly extrude the material therebetween adjacent the slits into conformity with the punch.

3. A method of forming a leak proof clinch joint for fastening a plurality of sheets of deformable material together, comprising:

overlapping the sheets to be fastened together in a generally parallel relationship to form an overlap region having a first side and a second side;

positioning the first side of the overlap region adjacent a die assembly having a central axis, a die face normal to the axis and a central die recess within the die face having a generally vertical wall extending thereabout and forming a rounded corner at the intersection of the wall and the die face;

positioning a punch adjacent the second side of the overlap region in coaxial alignment with the die, said punch having an axial punch projection with a free end and a wall forming a rounded corner at the intersection of free end and the punch projection wall, said punch projection sized to fit within the die recess with a radial clearance therebetween which varies about the periphery of the punch defining a plurality of low clearance regions and a plurality of alternately spaced high clearance regions; and advancing the punch axially relative to the die recess to simultaneously draw a plurality of nested cups in the overlapped sheets between the punch and the die without tearing the material of the sheets, said high and low radial clearances selected relative to the thickness of the plurality of sheets in order to prevent material tearing and to provide a joint with both good shear and peel strength.

4. The method of claim 3 wherein:
the radial clearance of any one of the plurality of alternate high clearance regions is at least twice that of any one of the low clearance regions.

5. The method of claim 4 wherein:
wherein the maximum radial clearance of any one of the plurality of alternate high clearance regions is twice that of the minimum radial clearance of any one of the low clearance regions.

6. The method of claim 3 wherein:
the vertical wall of the central die recess extends circumferentially about the central die recess.

7. The method of claim 3 wherein:
the wall of the punch projection is generally cylindrical so that the clinch joint has an inner cylindrical recess formed therein.

8. The method of claim 3 wherein:
one of the plurality of low clearance regions is a lowest clearance region having a radial clearance which is less than any of the other low clearance regions, and, at least one of the alternate high clearance regions has a radial clearance which is at least twice that of the radial clearance of the lowest clearance region.

9. A method of forming a lance-type clinch joint fastening a plurality of sheets of deformable material together, comprising:

overlapping the sheets to be fastened together in a generally parallel relationship to form an overlap region having a first and second side;

positioning the first side of the overlap region adjacent a die assembly having a central axis, a die face normal to the axis and a die recess formed therein having a vertical wall forming a corner at the intersection of the die face and the wall;

positioning a punch having a punch projection with a solid punch end sized to fit within the die recess, adjacent the second side of the overlap region aligned coaxially with the die recess, said punch projection having a plurality of outer wall portions forming a plurality of sharp cutting edges formed at the intersection of the wall portions and the punch end for cooperating with the die corner and spaced apart therefrom a clearance distance C which varies along the length of the cutting edges, said clearance distance C having a minimum value at a midpoint on each cutting edge and gradually increasing on both sides of said midpoint; and advancing the punch axially relative to the die recess to simultaneously shear a plurality of non-intersecting slits in the overlapping sheets, said slits thereby forming a central region connected to the remainder of the sheets by a plurality of webs.

10. The method of claim 9 further comprising continuing to advance the punch axially squeezing the central region of the overlapping sheets between the punch end and the die to plastically deform the material therein outwardly.

11. A method of forming a lance-type clinch joint for fastening a plurality of sheets of deformable material together, comprising:

overlapping the sheets to be fastened together in a generally parallel relationship to form an overlap region having a first and second side;

positioning the first side of the overlap region adjacent a die assembly having a central axis, a die face normal to the axis and a die recess formed therein having a plurality of generally vertical walls forming a plurality of sharp cutting edges and a plurality of alternately oriented rounded drawing corners at the intersection of the die face and the walls;

positioning a punch having a punch projection with a solid punch end sized to fit within the die recess adjacent the second side of the overlap region aligned coaxially with the die recess, said punch projection having a plurality of outer wall portions forming a plurality of sharp cutting edges and a plurality of alternately oriented rounded drawing corners formed at the intersection of the wall portions and the punch end cooperating in sufficiently spaced relation with a corresponding one of the die cutting edges and rounded drawing corners; and advancing the punch axially relative to the die recess to simultaneously shear a plurality of non-intersecting slits in the overlapping sheets and drawing a plurality of generally vertical webs, said slits forming a central region connected to the remainder of the sheets by said plurality of webs which are alternately spaced between adjacent slits.

12. The method of claim 11 further comprising continuing to advance the punch axially to simultaneously squeeze the central region of the overlapping sheets between the punch end and the die to thereby plastically deform the material therein outwardly into conformity with the die recess while squeezing the region of the overlapping sheets outboard of the non-intersecting slits between the punch and the die face to plastically deform the material therein into conformity with the punch projection.

* * * * *